US008498839B2

(12) United States Patent  
Miyamoto et al.

(10) Patent No.: US 8,498,839 B2
(45) Date of Patent: Jul. 30, 2013

(54) POSITION DETERMINATION SYSTEM, TRANSMISSION DEVICE AND RECEPTION DEVICE, AND POSITION DETERMINATION METHOD

(75) Inventors: Junichi Miyamoto, Tokyo (JP); Hiroshi Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 12/810,879

(22) PCT Filed: Dec. 19, 2008

(86) PCT No.: PCT/JP2008/073251
§ 371 (c)(1),
(2), (4) Date: Jun. 28, 2010

(87) PCT Pub. No.: WO2009/084490
PCT Pub. Date: Jul. 9, 2009

(65) Prior Publication Data
US 2010/0286949 A1    Nov. 11, 2010

(30) Foreign Application Priority Data
Dec. 28, 2007   (JP) ................................ 2007-339054

(51) Int. Cl.
G01B 21/00    (2006.01)
G06F 11/30    (2006.01)

(52) U.S. Cl.
USPC ........... 702/158; 702/159; 702/182; 702/188; 702/189

(58) Field of Classification Search
USPC ...................... 702/58, 59, 187–190, 158, 159
See application file for complete search history.

(56) References Cited

U.S. PATENT DOCUMENTS
6,118,205 A * 9/2000 Wood et al. ............... 310/316.01

FOREIGN PATENT DOCUMENTS

| JP | 60-176130 A | 9/1985 |
|----|-------------|--------|
| JP | 5-164844 A | 6/1993 |
| JP | 7-104063 A | 4/1995 |
| JP | 2001008262 A | 1/2001 |
| JP | 2004199560 A | 7/2004 |
| JP | 2006090726 A | 4/2006 |
| JP | 3876370 B | 1/2007 |
| WO | 2005111653 | * 11/2005 |
| WO | 2005111653 A | 11/2005 |

OTHER PUBLICATIONS

International Search Report (English) for PCT/JP2008/073251.*
International Search Report for PCT/JP2008/073251 mailed Jan. 27, 2009.
H Kashiwagi, "M- sequence and Its Applications", Shokodo Co., Ltd., Mar. 25, 1996, pp. 2-37.

* cited by examiner

*Primary Examiner* — Phuong Huynh

(57) ABSTRACT

A moving body includes a transmission device which simultaneously sends out a trigger signal and an ultrasonic signal modulated by pseudo random sequence data, and a reception device which detects a position of the moving body. The reception device includes two ultrasonic reception units The reception device includes a unit which calculates a correlation value between a waveform of the ultrasonic signal and a modulation reference waveform of a pseudo random sequence data assigned to the moving body The reception device includes a unit which calculates a time of propagation of the ultrasonic to arrive at the two ultrasonic reception units from a time point of reception of the trigger signal and a time point of detection of a first peak of the correlation value, and a unit which calculates a position of the moving body based on the ultrasonic propagation time and an interval length between the ultrasonic reception units.

15 Claims, 16 Drawing Sheets

POSITION DETERMINATION SYSTEM, TRANSMISSION DEVICE AND RECEPTION DEVICE, AND POSITION DETERMINATION METHOD

INCORPORATION BY REFERENCE

This application is the National Phase of PCT/JP2008/073251, filed Dec. 19, 2008, which is based upon and claims the benefit of priority from Japanese patent application No. 2007-339054, filed on Dec. 28, 2007, the disclosure of which is incorporated herein in its entirety by reference.

TECHNICAL FIELD

The present invention relates to a position determination system which determines a position of a moving body by using an ultrasonic signal and, more particularly, a position determination system, a transmission device, a reception device, and a position determination method which enable positions of a plurality of moving bodies to be precisely and stably determined.

BACKGROUND ART

Recited in Patent Literature 1 as one example of systems which measure a propagation time of ultrasonic to determine a position of a moving body is an electronic pen system. According to the position determination method which uses a propagation time of ultrasonic as recited in Patent Literature 1, an electronic pen as a transmitter simultaneously transmits an ultrasonic signal and a trigger signal in a fixed cycle to measure a time from a time point of reception of the trigger signal by a receiver and software until a time point of reception of the ultrasonic signal transmitted from the electronic pen as a propagation time of ultrasonic and determine a position of the electronic pen by using the propagation time.

The ultrasonic signal transmitted from the electronic pen, which is a signal whose waveform has such a burst shape as shown in FIG. 17, is transmitted with the same waveform in each transmission cycle. The receiver first receives a trigger signal and then receives an ultrasonic signal arriving with a delay according to a propagation distance as shown in FIG. 18.

Further recited, as another example of position determination by measuring a propagation time of ultrasonic transmitted from a plurality of emission sources, is an ultrasonic type coordinate input device which enables use of a plurality of pens at the same time in Patent Literature 2. In the position determination method using a propagation time of ultrasonic recited in Patent Literature 2, a fixed body (receiver) transmits an electromagnetic wave signal such as an infrared signal including ID information and a moving body (pen) side transmits ultrasonic only when receiving an electromagnetic wave signal relevant to its own ID. The interval of transmission of an electromagnetic wave signal including ID information is set to be longer than a time of moving of ultrasonic within the maximum range of coordinate input.

As shown in FIG. 19, with a sampling cycle T for measuring a coordinate, a time assigned to one pen will be T/n which is determined by a relationship with a drawing range. In a case where T is 10 ms and the drawing range is A4 size, a propagation distance of ultrasonic will be 350 mm at the maximum and a propagation time will be on the order of 1 ms, so that when T/n is set to be 2 ms taking into consideration a margin to prevent the time from falling in a time frame of other ID, five pens can be used simultaneously at the maximum.

On the other hand, assuming the use of an electronic pen on a projection screen of a projector, a screen size on the order of 80 inches will be required as a drawing range in practice, so that a propagation distance of ultrasonic transmitted from the electronic pen to reach a receiver will be about 2 m at the maximum and a propagation time will be on the order of 7 ms.

One example of methods of calculating a propagation time of a sound wave is recited in Patent Literature 3. The sound wave propagation time calculation method recited in Patent Literature 3 is a method in which with an M sequence phase-modulated wave used as a transmission wave, a receiver receives an M sequence phase-modulated wave transmitted by a transmitter and a matched filter obtains correlation between a reception signal and a transmission signal to detect a peak of an output of the matched filer and calculate a propagation time of a sound wave by a peak time.

Patent Literature 1: U.S. Pat. No. 6,118,205
Patent Literature 2: Japanese Patent Laying-Open No. 2004-199560
Patent Literature 3: Japanese Patent No. 3876370
Non-Patent Literature 1: Hiroshi Kashiwagi, "M-sequence and Its Applications", Mar. 25, 1996, Shokodo In a case of measuring a propagation time of ultrasonic from moving bodies as a plurality of determination targets, when an ultrasonic detection range is large, a propagation time of ultrasonic from the most distant point will be longer to require the above-described T/n to be set to be longer. The detection interval T, however, cannot be set to be long unnecessarily when, for example, preventing collision of bodies or reproducing handwriting by an electronic pen. When the most distant point locates as far as 2 m among as in a case where an electronic pen is used on a projection screen of a projector, the propagation time will be on the order of 7 ms, so that only one electronic pen can be used taking a margin into consideration.

Thus, according to the method recited in Patent Literature 1, when a propagation distance of ultrasonic is long, it is so difficult to detect positions of a plurality of moving bodies (electronic pens) precisely and stably that the pens cannot be used.

According to the method recited in Patent Literature 2, because as an ultrasonic transmission signal, the same signal waveform is assumed for a plurality of pens, detection of an arrival point of ultrasonic from different pens might be affected. A receiver, for example, receives a reflected wave of ultrasonic transmitted first which is propagated through a long distance prior to a direct wave transmitted from a different pen having a next ID and erroneously recognizes the first received reflected wave as a direct wave to erroneously measure an arrival time, so that it is impossible to calculate an accurate position of an electronic pen.

Furthermore, since a wave of a burst shape is assumed as an ultrasonic transmission signal, a configuration of a composite wave will change according to overlapping between a direct wave and a reflected wave, which makes it difficult to detect an arrival point of a direct wave arriving first and impossible to determine an accurate position of an electronic pen as a moving body.

A method of calculating a propagation time of a sound wave by using an M sequence phase-modulated wave as a transmission wave such as the method recited in Patent Literature 3 is a method of measuring a propagation time of a sound wave on a different propagation path on which a transmitter/receiver is disposed in advance and measuring a flow velocity of fluid flowing through a target object on which a transmitter/receiver is disposed, which method, when a plurality of transmitters (moving bodies) transmit ultrasonic simultaneously, is not allowed to identify the plurality of transmitters and measure a propagation time of ultrasonic from each transmitter, that is, is not allowed to determine positions of a plurality of moving bodies precisely and stably.

OBJECT OF THE PRESENT INVENTION

An object of the present invention is to provide a position determination system, a transmission device, a reception device and a position determination method which enable, when a plurality of moving bodies are used simultaneously, a position of each moving body to be determined accurately and stably.

Another object of the present invention is to provide a position determination system, a transmission device, a reception device and a position determination method which enable, even when a propagation distance of an ultrasonic signal is long, positions of a plurality of moving bodies to be determined accurately and stably.

SUMMARY

A first position detection system according to an exemplary aspect of the invention includes
at least one moving body including a transmission device which simultaneously sends out a trigger signal indicative of transmission timing and an ultrasonic signal modulated by pseudo random sequence data having high self-correlativity, and
a reception device which receives the trigger signal and the ultrasonic signal to detect a position of the moving body, wherein
the reception device comprising
at least two ultrasonic reception units provided with a predetermined interval which receive the ultrasonic signal,
a unit which calculates a correlation value between a waveform of the ultrasonic signal and a modulation reference waveform of the pseudo random sequence determined in advance according to the moving body,
a unit which detects a first peak of the correlation value calculated and calculates a time of propagation of the ultrasonic to arrive at the two ultrasonic reception units from a time point of reception of the trigger signal and a time point of detection of the correlation peak, and
a unit which calculates a position of the moving body based on the ultrasonic propagation time calculated and the interval length between the ultrasonic reception units,
as the pseudo random sequence, different sequences whose cross-correlativity is low are used.

A second position detection system according to an exemplary aspect of the invention includes
at least one moving body including a transmission device which simultaneously sends out an ultrasonic signal modulated by a pseudo random signal having high self-correlativity, and
a reception device which receives the ultrasonic signal to detect a position of the moving body, wherein
the transmission device of the moving body comprises
a unit which receives a trigger signal indicative of transmission timing, and
a unit which transmits the ultrasonic signal at the timing of reception of the trigger signal,
the reception device comprises
a unit which sends out the trigger signal,
at least two ultrasonic reception units provided with a predetermined interval which receive the ultrasonic signal,
a unit which calculates a correlation value between a waveform of the ultrasonic signal and a modulation reference waveform of the pseudo random sequence determined in advance according to the moving body,
a unit which detects a first peak of the correlation value calculated and calculates a time of propagation of the ultrasonic to arrive at the two ultrasonic reception units from a time point of reception of the trigger signal and a time point of detection of the correlation peak, and
a unit which calculates a position of the moving body based on the ultrasonic propagation time calculated and the interval length between the ultrasonic reception units, and
as the pseudo random sequence, different sequences whose cross-correlativity is low are used.

According to an exemplary aspect of the invention, a fist transmission device of a position detection system which receives, at a reception device, an ultrasonic signal transmitted from the transmission device to detect a position of the transmission device, comprising:
a trigger signal transmission unit which sends out a trigger signal indicative of transmission timing, and an ultrasonic transmission unit which sends out an ultrasonic signal modulated by a pseudo random signal having high self-correlativity in synchronization with transmission of the trigger signal, wherein
as a sequence of a pseudo random signal of the ultrasonic signal, different sequences whose cross-correlativity is low are used.

According to an exemplary aspect of the invention, a second transmission device of a position detection system which receives, at a reception device, an ultrasonic signal transmitted from the transmission device to detect a position of the transmission device, comprising:
an ultrasonic transmission unit which sends out an ultrasonic signal modulated by a pseudo random signal having high self-correlativity in synchronization with a trigger signal indicative of transmission timing transmitted from the reception device, wherein
as a sequence of a pseudo random signal of the ultrasonic signal, different sequences whose cross-correlativity is low are used.

According to an exemplary aspect of the invention, a first reception device of a position detection system which receives, at the reception device, an ultrasonic signal transmitted from a transmission device to detect a position of the transmission device, comprising:
a trigger signal reception unit which receives a trigger signal indicative of transmission timing which is transmitted from the transmission device,
at least two ultrasonic reception units provided with a predetermined interval which receive the ultrasonic signal modulated by a pseudo random signal having high self-correlativity which is transmitted from the transmission device in synchronization with the trigger signal,
a unit which calculates a correlation value between a waveform of the ultrasonic signal and a modulation reference waveform determined in advance according to the moving body,
a unit which detects a first peak of the correlation value calculated and calculates a time of propagation of the ultrasonic to arrive at the two ultrasonic reception units from a time point of reception of the trigger signal and a time point of detection of the correlation peak, and
a unit which calculates a position of the moving body based on the ultrasonic propagation time calculated and the interval length between the ultrasonic reception units, wherein
as a sequence of a pseudo random signal of the ultrasonic signal, different sequences whose cross-correlativity is low are used.

According to an exemplary aspect of the invention, a second reception device of a position detection system which receives, at the reception device, an ultrasonic signal transmitted from a transmission device to detect a position of the transmission device, comprising:

a trigger signal transmission unit which transmits a trigger signal indicative of transmission timing to the transmission device, at least two ultrasonic reception units provided with a predetermined interval which receive the ultrasonic signal modulated by a pseudo random signal having high self-correlativity that is transmitted from the transmission device in synchronization with the trigger signal, a unit which calculates a correlation value between a waveform of the ultrasonic signal and a modulation reference waveform determined in advance according to the moving body, a unit which detects a first peak of the correlation value calculated and calculates a time of propagation of the ultrasonic to arrive at the two ultrasonic reception units from a time point of reception of the trigger signal and a time point of detection of the correlation peak, and a unit which calculates a position of the moving body based on the ultrasonic propagation time calculated and the interval length between the ultrasonic reception units, wherein as a sequence of a pseudo random signal of the ultrasonic signal, different sequences whose cross-correlativity is low are used.

According to an exemplary aspect of the invention, a first position detection method, wherein at least one transmission device executes the step of simultaneously transmitting a trigger signal indicative of transmission timing and an ultrasonic signal modulated by a pseudo random signal having high self-correlativity, a reception device which receives the trigger signal and the ultrasonic signal to detect a position of the moving body executes the steps of:

receiving the ultrasonic signal by at least two ultrasonic reception units provided with a predetermined interval, calculating a correlation value between a waveform of the ultrasonic signal and a modulation reference waveform determined in advance according to the moving body, detecting a first peak of the correlation value calculated and calculating a time of propagation of the ultrasonic to arrive at the two ultrasonic reception units from a time point of reception of the trigger signal and a time point of detection of the correlation peak, and calculating a position of the moving body based on the ultrasonic propagation time calculated and the interval length between the ultrasonic reception units, and as a sequence of a pseudo random signal of the ultrasonic signal sent by the transmission device, different sequences whose cross-correlativity is low are used.

According to an exemplary aspect of the invention, a second position detection method, wherein at least one transmission device executes the steps of:

receiving a trigger signal indicative of transmission timing, and transmitting an ultrasonic signal modulated by a pseudo random signal having high self-correlativity at the timing of reception of the trigger signal, a reception device which receives the ultrasonic signal to detect a position of the moving body executes the steps of:

sending out the trigger signal, receiving the ultrasonic signal by at least two ultrasonic reception units provided with a predetermined interval, calculating a correlation value between a waveform of the ultrasonic signal and a modulation reference waveform of the pseudo random sequence determined in advance according to the moving body, detecting a first peak of the correlation value calculated and calculating a time of propagation of the ultrasonic to arrive at the two ultrasonic reception units from a time point of reception of the trigger signal and a time point of detection of the correlation peak, and calculating a position of the moving body based on the ultrasonic propagation time calculated and the interval length between the ultrasonic reception units, and as the pseudo random sequence, different sequences whose cross-correlativity is low are used.

When a plurality of moving bodies are used simultaneously, the present invention enables a position of each moving body to be determined accurately and stably.

EXEMPLARY EMBODIMENT

Next, exemplary embodiments of the present invention will be detailed with reference to the drawings.

First Exemplary Embodiment

Figure 1:
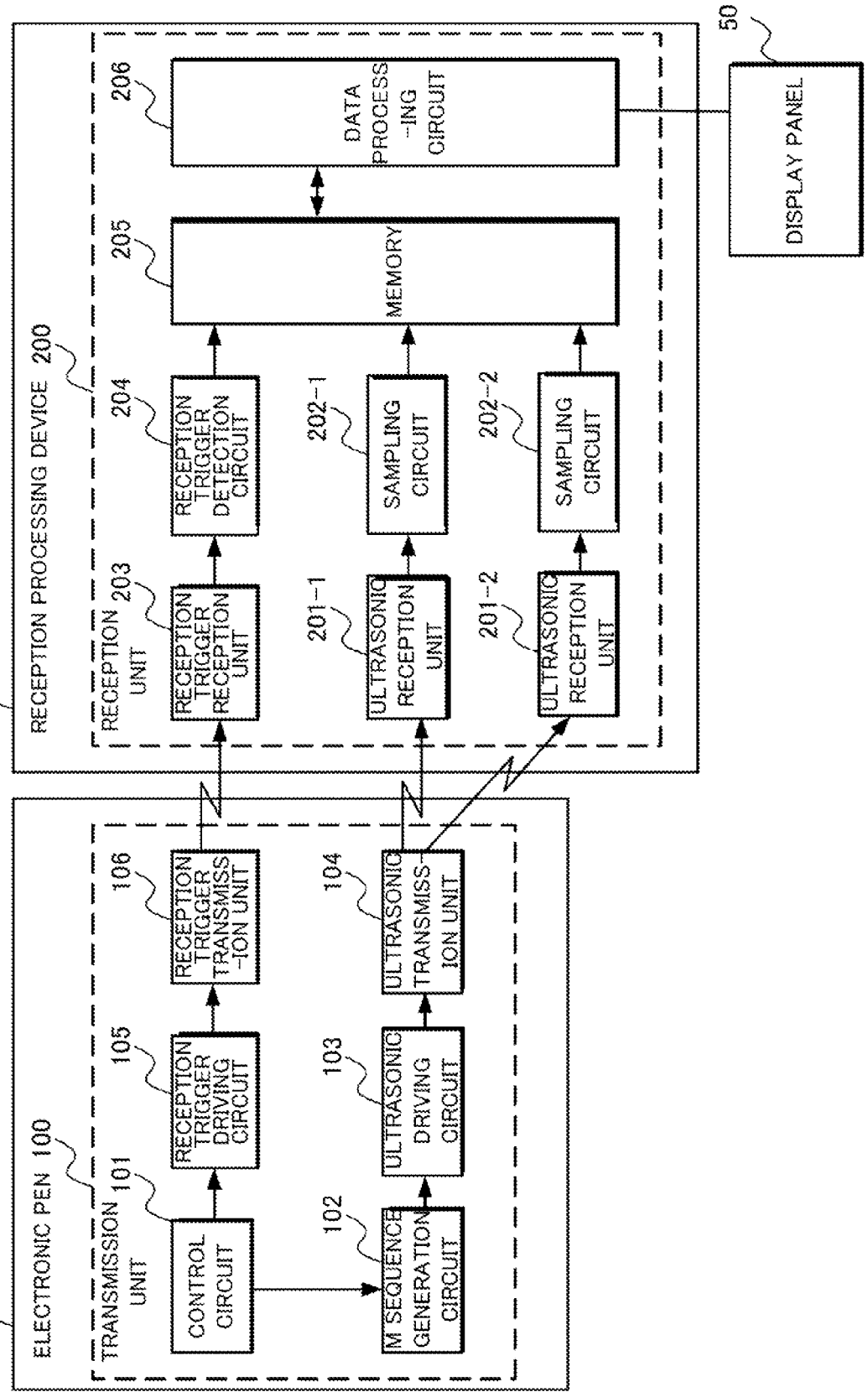
FIG. 1 is a block diagram showing a structure of an electronic pen system to which a position determination system according to a first exemplary embodiment of the present invention is applied.

FIG. 1 is a block diagram showing a structure of a position detection system according to a first exemplary embodiment of the present invention. In the following exemplary embodiment, description will be made of a case where a position detection system according to the present invention is applied to an electronic pen system.

In FIG. 1, the position detection system according to the first exemplary embodiment of the present invention comprises an electronic pen 10 equipped with a transmission unit 100, a reception device 20 disposed at a predetermined position apart from the electronic pen 10, and a display panel 50 which displays a locus drawn by the electronic pen 10. The electronic pen 10 is used on the display panel 50. The display panel 50 may be a projection screen projected by a projector.

The transmission unit 100 of the electronic pen 10 comprises a control circuit 101, an M sequence generation circuit 102, an ultrasonic driving circuit 103, an ultrasonic transmission unit 104, a reception trigger driving circuit 105 and a reception trigger transmission unit 106.

The M sequence generation circuit 102 has a function of generating a coded bit string of an M sequence. The M sequence is a sequence generated by defining a characteristic polynomial and an initial condition. Details of an M sequence are described in, for example, Hiroshi Kashiwagi, "M-sequence and Its Applications", Mar. 25, 1996, Shokodo (Non-Patent Literature 1).

The control circuit 101 outputs predetermined characteristic polynomial and initial condition of an M sequence to the M sequence generation circuit 102. The M sequence generation circuit 102 generates a coded bit string of the M-sequence (M sequence data) according to the characteristic polynomial and the initial condition received from the control circuit 101.

The ultrasonic driving circuit 103 generates and outputs a driving signal for modulating ultrasonic based on the M sequence data generated by the M sequence generation circuit 102. The ultrasonic transmission unit 104 sends out into space an ultrasonic signal which is M-sequence modulated by the driving signal from the ultrasonic driving circuit 103.

Used as a method of modulating an ultrasonic signal by the ultrasonic transmission unit 104 is, for example, a phase modulation method.

In a case, for example, where a data string is used whose sequence length is 15 bits and which is generated by such quartic characteristic polynomial as $f(x)=x^4+x+1$, 15 different M sequence data whose data arrangement is circularly shifted are generated by changing the initial condition.

Figure 2:
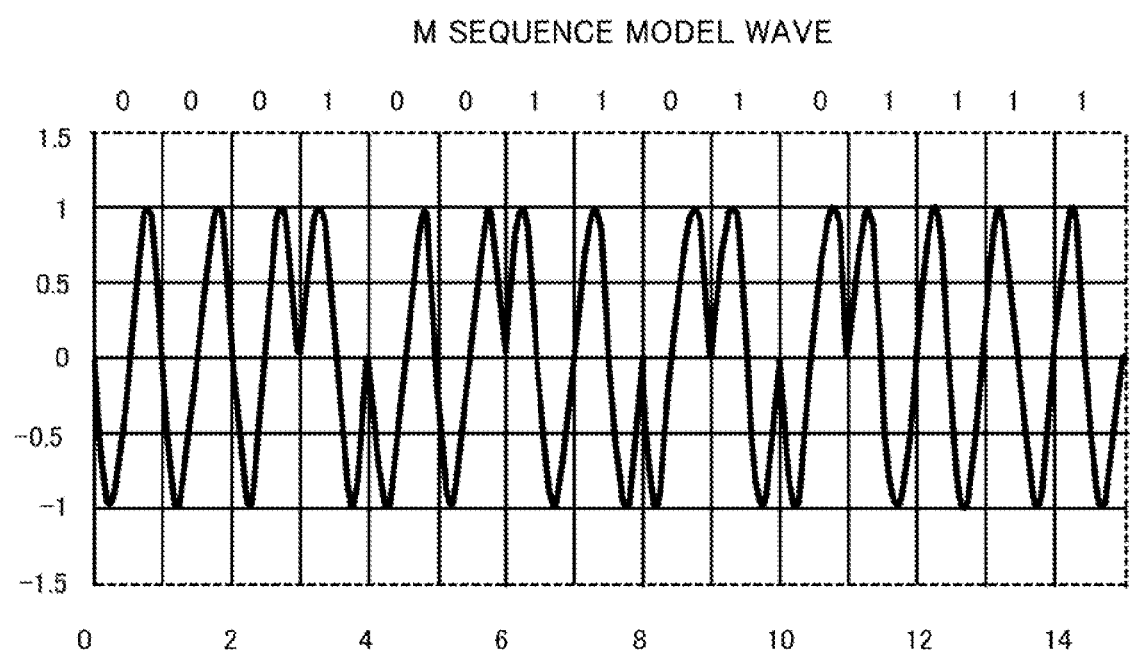
FIG. 2 is a diagram showing an example of an M sequence model waveform generated by a reception processing device according to the first exemplary embodiment of the present invention.

FIG. 2 shows an example of an M sequence model waveform of ultrasonic whose phase is modulated by M sequence data. In this example, each one bit of the 15-bit M sequence data "000100110101111" is set to correspond to one cycle of a basic wave. A bit "0" has an inverted phase and a bit "1" has a forward phase, and a modulated wave has a length equivalent to 15 cycles of the basic wave.

On the other hand, the control circuit 101 outputs a signal instructing the reception trigger driving circuit 105 to generate a trigger signal. The reception trigger driving circuit 105 generates a reception trigger driving signal based on the instruction signal from the control circuit 101.

The reception trigger transmission unit 106 is driven by a reception trigger driving signal from the reception trigger driving circuit 105 in synchronization with transmission timing of an ultrasonic signal from the ultrasonic transmission unit 104 to send a trigger signal into space. The trigger signal is transmitted as an infrared signal which is an electromagnetic signal, for example.

The trigger signal transmitted from the reception trigger transmission unit 106 is set to be a signal which allows each electronic pen 10 to be unitarily identified. When a plurality of electronic pens 10 are used, used as a trigger signal is a signal whose band is divided so as to prevent overlapping for each electronic pen 10.

The reception device 20 comprises a reception unit 200 including ultrasonic reception units 201-1 and 201-2, sampling circuits 202-1 and 202-2, a reception trigger reception unit 203, a reception trigger detection circuit 204, a memory 205 and a data processing circuit 206.

The ultrasonic reception units 201-1 and 202-2, which are disposed apart from each other with a predetermined interval length, receive an ultrasonic signal transmitted from the electronic pen 10 and convert the same into an electric signal.

The sampling circuits 202-1 and 202-2 sample an electric signal output from the ultrasonic reception units 201-1 and 202-2 at fixed intervals and sequentially store the same in the memory 205.

The reception trigger reception unit 203 receives a trigger signal from the electronic pen 10 and converts the trigger signal into an electric signal to output the signal as a trigger pulse. Upon detecting a trigger pulse from the reception trigger reception unit 203, the reception trigger detection circuit 204 stores a detection time (arrival time) of the trigger pulse in the memory 205 as trigger detection time data.

The data processing circuit 206 reads the same M sequence initial condition as that of the transmission unit 100 from the memory 205 and uses a characteristic polynomial set in advance to generate a model waveform of an ultrasonic signal transmitted, execute processing of correlating the model waveform and an ultrasonic signal waveform received at each of the ultrasonic reception units 201-1 and 201-2 which is stored in the memory 205 and sequentially store a correlation value obtained by the correlation processing in the memory 205 with respect to each of the ultrasonic signal waveforms received at the ultrasonic reception units 201-1 and 201-2.

In addition, upon detecting a leading peak of a correlation value stored in the memory 205, with respect to each ultrasonic signal received by each of the ultrasonic reception units 201-1 and 201-2, the data processing circuit 206 calculates a lapse of time from an arrival time of a trigger pulse until a time when a peak is detected, that is, a propagation time of an ultrasonic signal arriving at the reception device 20 from the electronic pen 10.

Furthermore, based on the propagation time of an ultrasonic signal arriving at the reception device 20 from the electronic pen 10 which is calculated for each ultrasonic signal received by each of the ultrasonic reception units 201-1 and 201-2 and the interval length between the ultrasonic reception units 201-1 and 201-2, the data processing circuit 206 calculates a position of the electronic pen 10 on the display panel 50.

As described above, it is possible to precisely determine a position of the electronic pen 10 by the principle of trigonometrical survey based on the propagation time of ultrasonic signals received at the two ultrasonic reception units 201-1 and 201-2 of the reception device 20 and the interval length between the ultrasonic reception units 201-1 and 201-2.

Also assume that different M sequence data is assigned to each of a plurality of electronic pens 10 existing. A cross-correlation value between different M sequence data will be decreased and a self-correlation value of the same M sequence data will be increased. Therefore, executing processing of correlating an ultrasonic waveform with an M-sequence model waveform to be detected will result in detecting an arrival point of ultrasonic as a peak of a correlation value of the relevant M sequence data.

The position detection system according to the present exemplary embodiment selects an M sequence for use in the system (hereinafter referred to as an M sequence selection mode) when setting up the electronic pen system. In the following, description will be made of a procedure in the M sequence selection mode.

In the M sequence selection mode, a trigger signal and an ultrasonic signal are repeatedly sent from the electronic pen 10. At this time, an ultrasonic signal modulated by M sequence data differing in each transmission is sent from the electronic pen 10.

At every reception of a trigger signal and an ultrasonic signal, the reception device 20 obtains a value of correlation with all the M sequence model waveforms for use in ultrasonic signals and checks a value of cross-correlation between different M sequences. At this time, give higher evaluation to M sequence data whose peak of a cross-correlation value is smaller and starting with an M sequence whose peak of a cross-correlation value is the smallest among all the M sequences, assign an M sequence (initial condition) forming a combination of M sequences for the cross-correlation value as an M sequence for use for each electronic pen 10.

When in an ultrasonic propagation time measurement mode, a trigger signal and an ultrasonic signal generated based on an M sequence (initial condition) assigned to each electronic pen 10 are sent out, the data processing circuit 206 of the reception device 20 having received the signals executes correlation processing. Then, upon detecting a first peak of the correlation value, calculate an elapsed time from a time of detection of a trigger pulse until a time of detection of the peak, that is, a propagation time of the ultrasonic signal arriving at the reception device 20 from the electronic pen 10.

When in the M sequence selection mode, a combination of M sequences with respect to a cross-correlation is obtained such as, starting with the smallest peak of a cross-correlation value, "a combination between the sequence 1 of a transmission M sequence and a sequence 2 of an M sequence of a reception M sequence model waveform", "a combination between the sequence 1 of a transmission M sequence and a sequence 5 of an M sequence of a reception M sequence model waveform" and "a combination between the sequence 2 of a transmission M sequence and a sequence 6 of an M sequence of a reception M sequence model waveform", assign the sequence 1, the sequence 2, the sequence 5 and the sequence 6 to the respective electronic pens, respectively.

When an M sequence to be assigned to each electronic pen 10 is determined, set an initial condition of the assigned M sequence at the control circuit 101 of the corresponding electronic pen 10, so that the control circuit 101 outputs the set initial condition of the M sequence to the M sequence generation circuit 102 in the generation of M sequence data.

As to each cross-correlation value, it can be a value normalized by division by a peak of a self-correlation value of the same M sequence.

The position of the electronic pen 10 and a display position within a drawing range of the display panel 50 are correlated in advance and at the time of drawing, while a switch which turns on in linkage with press of the display panel 50 that is disposed at the tip of the electronic pen 10 is being pressed, repetitious transmission of a trigger signal and an ultrasonic signal from the electronic pen 10 in a fixed cycle enables loci of a plurality of electronic pens 10 to be drawn on the display panel 50 with high precision.

Figure 3:
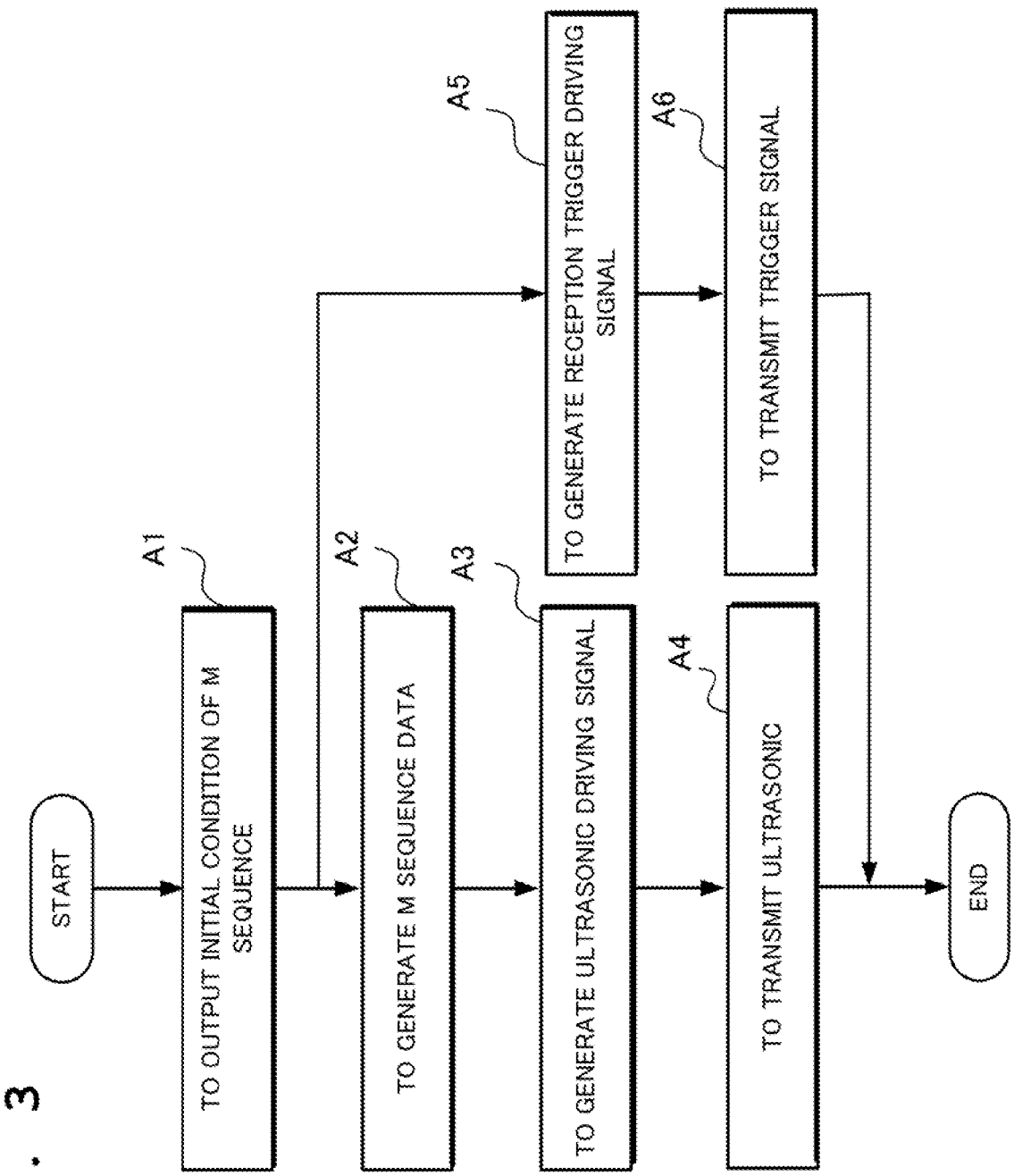
FIG. 3 is a flow chart for use in explaining operation of the electronic pen according to the first exemplary embodiment of the present invention.

Next, with reference to the flow chart of FIG. 3, description will be made of operation by the transmission unit 100 of the electronic pen 10. During operation, the electronic pen 10 repeats the following operation in a fixed cycle.

First, when the electronic pen 10 starts operation, the control circuit 101 outputs an initial condition of an M sequence characteristic polynomial set in advance to the M sequence generation circuit 102 (Step A1).

The M sequence generation circuit 102 generates M sequence data based on the initial condition obtained from the control circuit 101 (Step A2) and supplies the same to the ultrasonic driving circuit 103. The ultrasonic driving circuit 103 generates and outputs a driving signal for modulating ultrasonic based on the M sequence data generated by the M sequence generation circuit 102 (Step A3).

When the driving signal is generated at Step A3, the ultrasonic transmission unit 104 sends out an ultrasonic signal which is M-sequence-modulated by the driving signal from the ultrasonic driving circuit 103 from the electronic pen 10 into space (Step A4).

Upon determining an initial condition of an M sequence, the control circuit 101 instructs the reception trigger driving circuit 105 to generate a trigger signal. The reception trigger driving circuit 105 generates a reception trigger driving signal based on the instruction signal from the control circuit 101 (Step A5).

The reception trigger transmission unit 106 sends the trigger signal generated by the reception trigger driving signal from the reception trigger driving circuit 105 into space in synchronization with transmission timing of the ultrasonic signal (Step A6). Next, with reference to the flow chart shown in FIG. 4, description will be made of operation of the data processing circuit 206 of the reception device 20. As a preceding stage of the processing by the data processing circuit 206, the sampling circuit 202 samples ultrasonic signals received at the respective ultrasonic reception units 201-1 and 201-2 at fixed sampling intervals and sequentially stores the sampled waveform data in the memory 205. In this case, waveform data obtained by sampling the ultrasonic signals received by the ultrasonic reception units 201-1 and 201-2 are individually stored in the memory 205.

On the other hand, upon detecting a trigger pulse from the trigger signal received at the reception trigger reception unit 203, the reception trigger detection circuit 204 generates trigger detection time data indicative of a trigger pulse detection time (arrival time) and stores the same in the memory 205.

Figure 4:
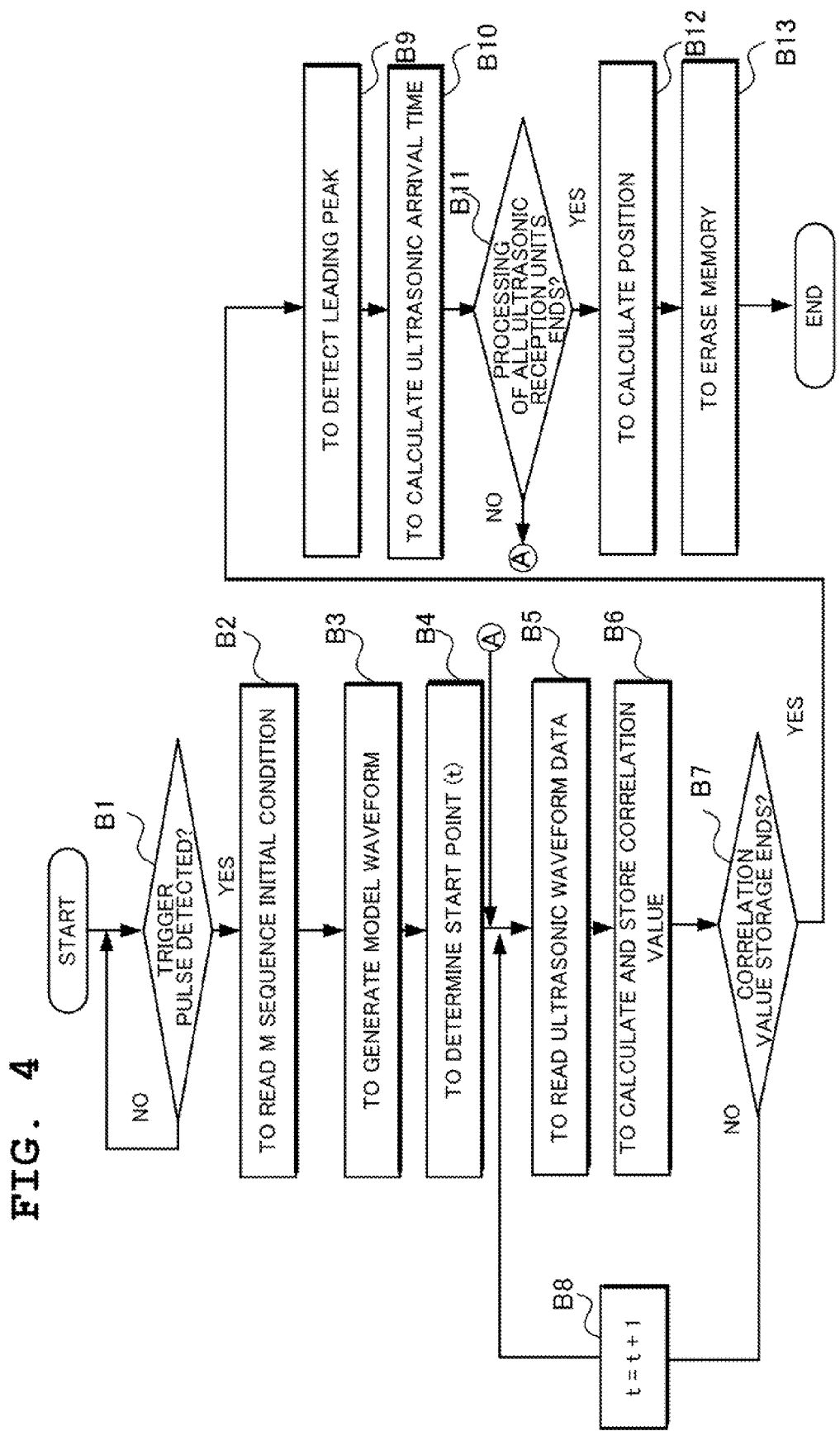
FIG. 4 is a flow chart for use in explaining operation of the reception processing device according to the first exemplary embodiment of the present invention.

In FIG. 4, when the reception trigger detection circuit 204 detects a reception trigger pulse (Step B1), the data processing circuit 206 reads initial condition data of an M sequence which is stored in advance from the memory 205 (Step B2).

Next, the data processing circuit 206 generates an M sequence model waveform of the ultrasonic signal transmitted by using the read M sequence initial condition data and the characteristic polynomial set in advance (Step B3).

Next, set the trigger detection time indicated by the trigger detection time data stored in the memory 205 to be the sampling start time (t) (Step B4) and read the waveform data of the received ultrasonic signal from the memory 205 (Step B5).

The data processing circuit 206 derives a correlation value C(t) at the sampling time (t) between the read waveform data of the ultrasonic signal and the previously generated M sequence model waveform by using the following Expression (1) and stores the calculated correlation value C(t) in the memory 205 (Step B6).

$$C(t) = \frac{1}{N}\sum_{i=0}^{N-1} r(i)f(i+t) \qquad (1)$$

In the Expression (1), "i" is an integral value which represents a sampling time variable, "N" represents the number of samplings of a model waveform, "r(i)" represents a value of a model waveform at a sampling time i and "f(i+t)" represents a value of a waveform at a sampling time (i+t).

When not all the correlation values are stored in the memory 205 (Step B7), increment the sampling time t by a unit time of "1" to return to the processing at Step B5.

When calculation and storage of all the correlation values is completed at Step B7 by the repetitious execution of the processing at Steps B5 and B6, detect a leading peak (first peak) from the correlation values stored in the memory 205 (Step B9).

The data processing circuit 206 calculates time of ultrasonic propagation from the electronic pen 10 based on the sampling start time (trigger detection time) set at Step B4 and the leading peak detection time detected at Step B9 (Step B10).

With a sampling time as time when a trigger pulse is detected set to be "0" and a sampling cycle set to be □T, the ultrasonic propagation time can be calculated as t×□T.

When a peak has a ratio to a maximum peak of a correlation value not less than a fixed ratio, recognizing the peak as a peak of a direct wave enables reliable detection of an arrival time of an ultrasonic signal as a leading (first) direct wave without being affected by a reflected wave.

At Step B11, determine whether processing with respect to the ultrasonic signals received at all the ultrasonic reception units 201-1 and 201-2 is completed or not and when the processing is yet to be completed, repeat the processing of reading waveform data of an ultrasonic signal starting at Step B5.

When the processing with the ultrasonic signals received at all the ultrasonic reception units 201-1 and 201-2 is completed, calculate a position of the electronic pen 10 on the display panel 50 based on a propagation time calculated for each ultrasonic signal received at each of the ultrasonic reception units 201-1 and 201-2 and an interval length between the ultrasonic reception units 201-1 and 201-2 (Step B12). Thereafter, erase the memory 205 at Step B13.

Example of a position calculation procedure by the data processing circuit 206 will be described in the following.

Figure 5:
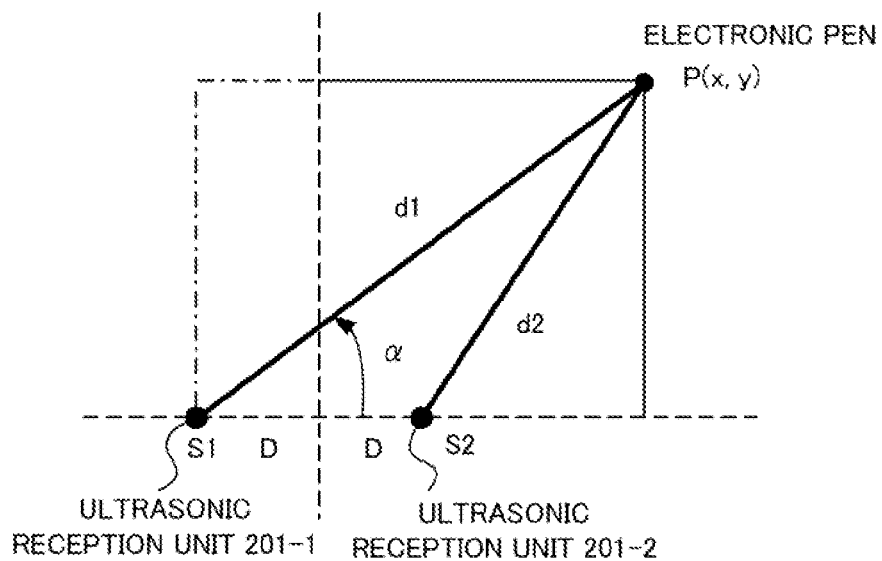
FIG. 5 is a diagram two-dimensionally showing a method of calculating a position of the electronic pen according to the first exemplary embodiment of the present invention.

FIG. 5 is a diagram two-dimensionally showing a method of calculating a position between the electronic pen 10 and the ultrasonic reception units 201-1 and 201-2. In FIG. 5, P represents a position coordinate value (x, y) at coordinates x-y in a drawing range of the electronic pen 10 on the display panel 50 and S1 and S2 represent positions of the ultrasonic reception units 201-1 and 201-2, respectively.

d1 represents a distance from the electronic pen 10 to the ultrasonic reception unit 201-1 and d2 represents a distance from the electronic pen 10 to the ultrasonic reception unit 201-2. D represents a distance from the origin when the center of the ultrasonic reception units 201-1 and 202-2 is set to be the origin of the x-y coordinates. α represents an angle formed by a straight line linking the electronic pen 10 and the ultrasonic reception unit 201-1 and the x-axis.

Here, set the propagation times calculated based on the ultrasonic signals received at the ultrasonic reception units 201-1 and 201-2 to be t1 and t2 and set a sound velocity to be A.

The distances d1 and d2 can be calculated as d1=A×t1 and d2=A×t2. Since the following Expression (2) holds between an interval length (2D) between the ultrasonic reception units 201-1 and 201-2 and the distances d1 and d2, the position (x, y) of the electronic pen 10 can be obtained by the calculation by the Expression (3).

$$d_2^2 = (2D)^2 + d_1^2 - 1(2D)d_1\cos\alpha \qquad (2)$$

$$\rightarrow d_1\cos\alpha = \frac{(2D)^2 + d_1^2 - d_2^2}{4D}$$

$$x = d_1\cos\alpha - D = \frac{d_1^2 - d_2^2}{4D} \qquad (3)$$

$$y = \sqrt{d_1 - (x+D)^2}$$

As described above, it is possible to precisely determine a position of the electronic pen 10 by the principle of trigonometrical survey based on the propagation time of ultrasonic signals received at the two ultrasonic reception units 201-1 and 201-2 of the reception device 20 and the interval length between the ultrasonic reception units 201-1 and 201-2.

By correlating the position of the electronic pen 10 and a display position of the display panel 50 in advance by the foregoing operation, at the time of drawing, while the tip of the electronic pen 10 is being pressed by a switch which operates in linkage with the tip of the pen, repetitious transmission of a trigger signal and an ultrasonic signal in a fixed cycle enables loci of a plurality of electronic pens 10 to be sequentially drawn with high precision.

As a mode of implementation, usable as a trigger signal for each electronic pen 10 are infrared signals whose wavelengths are different to an extent that fails to interfere with each other. In this case, the reception trigger reception unit 203 receives a reception trigger of each wavelength to be used. Upon detecting a trigger pulse from the output of the reception trigger reception unit 203, the reception trigger detection circuit 204 stores an arrival time of a trigger pulse of each wavelength corresponding to each electronic pen 10 in the memory 205.

With respect to the ultrasonic signal received at the reception device 20, execute correlation processing by a model waveform of an M sequence assigned to each electronic pen 10 and from an arrival time of the ultrasonic signal detected (trigger pulse detection time) and a time of detection of a leading peak of a correlation value, calculate a propagation time.

As other mode of implementation, it is possible to use, as a rigger signal, an infrared signal of the same wavelength and use a reception trigger pulse signal of a different M sequence for each electronic pen 10. In this case, the reception trigger detection circuit 204 of the reception device 20 detects an arrival time of the reception trigger pulse signal by executing correlation processing by a model waveform of an M sequence for each electronic pen 10. In this case, use of an M sequence whose bit length is long and change of a pulse width for each electronic pen 10 enables deterioration of a detection precision to be prevented which is caused when pulse signals of the respective electronic pens 10 overlap.

In the following, with reference to specific waveforms, description will be made of an example of a case where ultrasonic signals from two electronic pens 10-1 and 10-2 are received.

Figure 6:
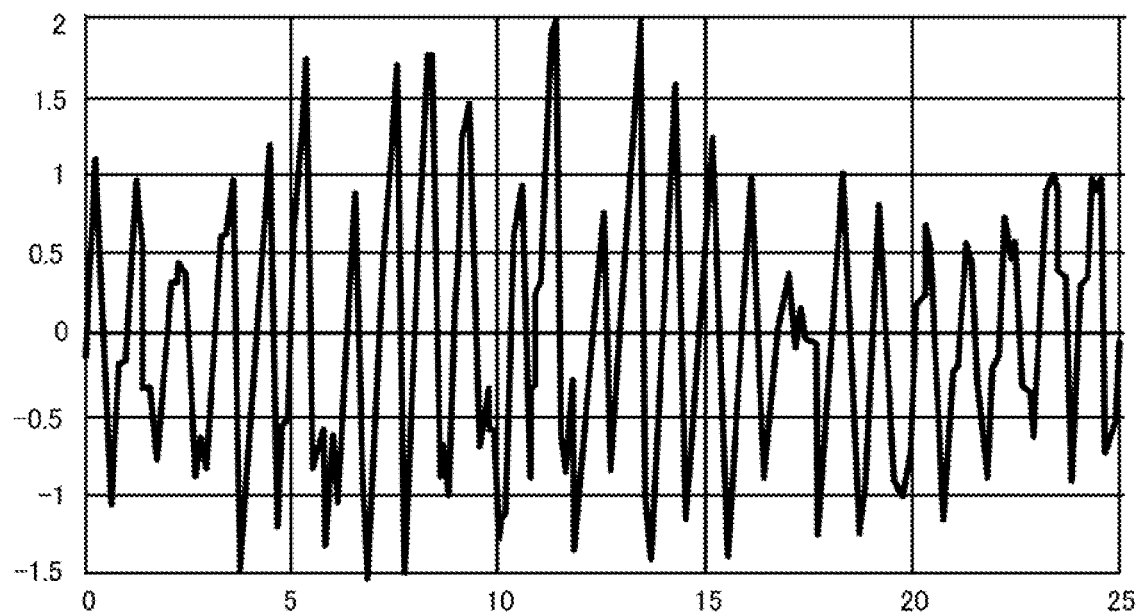
FIG. 6 is a diagram showing an example of a composite ultrasonic waveform to be stored in a memory of the reception processing device according to the first exemplary embodiment of the present invention.

FIG. 6 shows a waveform of an ultrasonic signal stored in the memory 205 when ultrasonic signals from the two electronic pens 10-1 and 10-2 are received. Waveform of an ultrasonic signal stored in the memory 205 will be a composite wave of a direct wave, a reflected wave and a noise waveform of the ultrasonic signals transmitted from the two electronic pens 10-1 and 10-2. The waveform shown in FIG. 6 is a waveform obtained when an interval of sampling by the sampling circuit 202 is set to be one-eighth of a basic cycle of ultrasonic. Abscissa represents time with a time point where a trigger signal of the electronic pen 10-2 is received set to be "0". In a case of ultrasonic whose frequency is 40 kHz, the cycle will be 25 ms and the sampling interval will be 3.125 ms.

Figure 7:
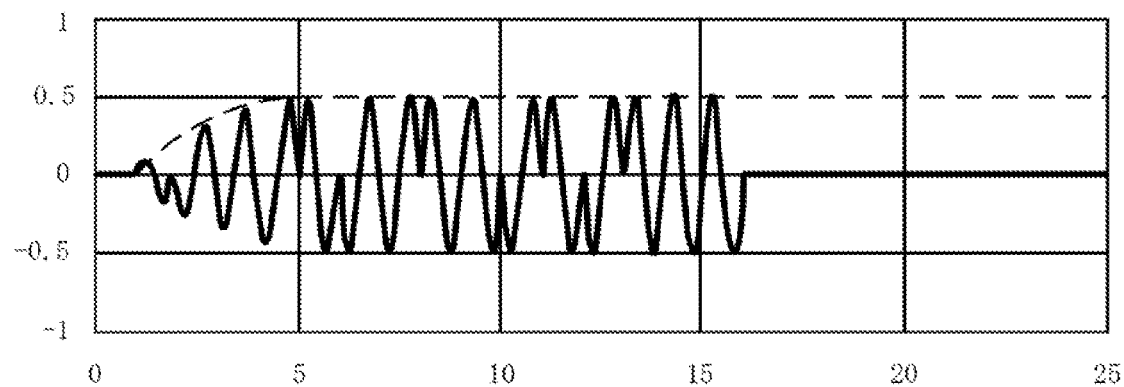
FIG. 7 is a diagram showing an example of a direct wave from an electronic pen 10-1 which is included in the composite waveform shown in FIG. 6.

FIG. 7 shows a waveform of a direct wave of an ultrasonic signal from the electric pen 10-1 whose phase is modulated by a 15-bit M sequence data string "100010011010111". This waveform is included in the composite waveform shown in FIG. 6.

Figure 8:
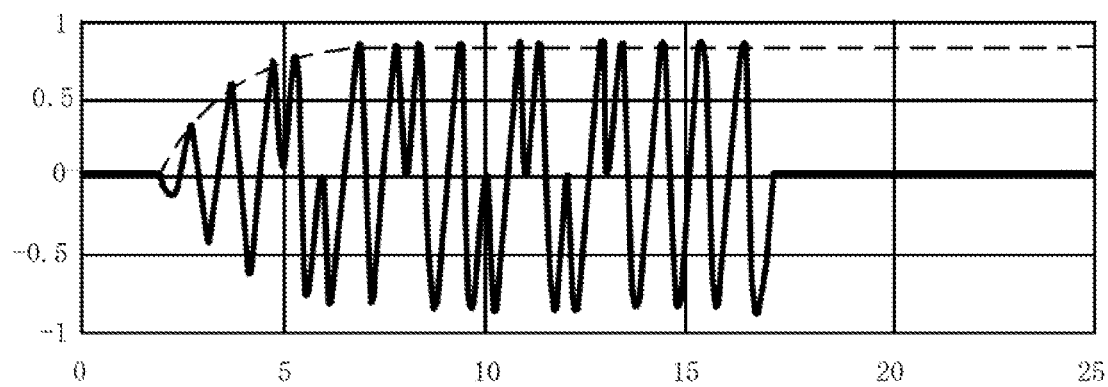
FIG. 8 is a diagram showing an example of a direct wave from an electronic pen 10-2 which is included in the composite waveform shown in FIG. 6.

FIG. 8 shows a waveform of a direct wave of an ultrasonic signal from the electronic pen 10-2 whose phase is modulated by a 15-bit M sequence data string "000100110101111" whose initial value is different from that of the electronic pen 10-1, which is also included in the composite waveform.

Figure 9:
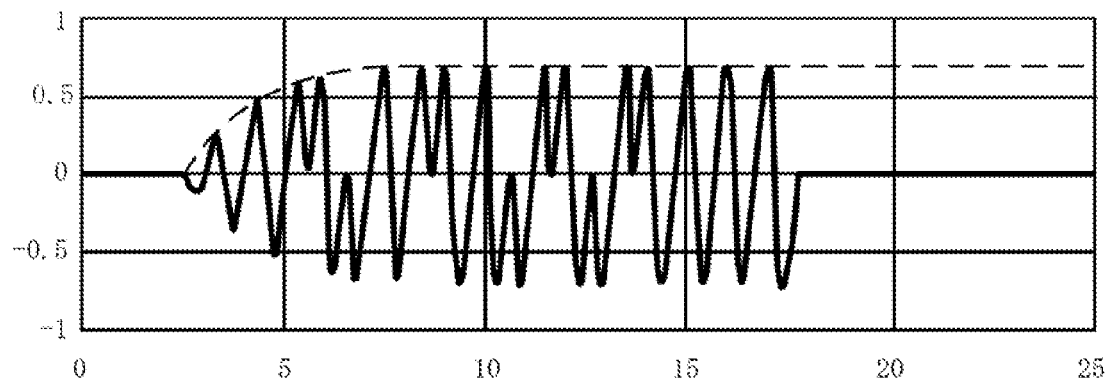
FIG. 9 is a diagram showing an example of a reflected wave from the electronic pen 10-2 which is included in the composite waveform shown in FIG. 6.
Figure 10:
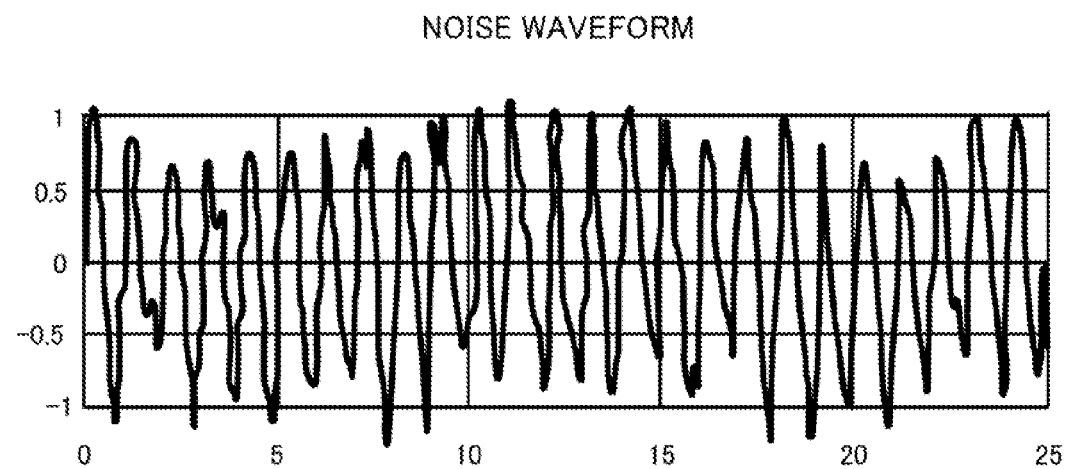
FIG. 10 is a diagram showing an example of a noise waveform included in the composite waveform shown in FIG. 6.

FIG. 9 shows a waveform of a reflected wave of an ultrasonic signal from the electronic pen 10-1. Phase of the reflected wave is the same as that of the direct wave of the electronic pen 10-2 shown in FIG. 8. FIG. 10 shows a noise waveform. The reflected waveform shown in FIG. 9 and a noise waveform shown in FIG. 10 are also included in the composite wave shown in FIG. 6.

Figure 11:
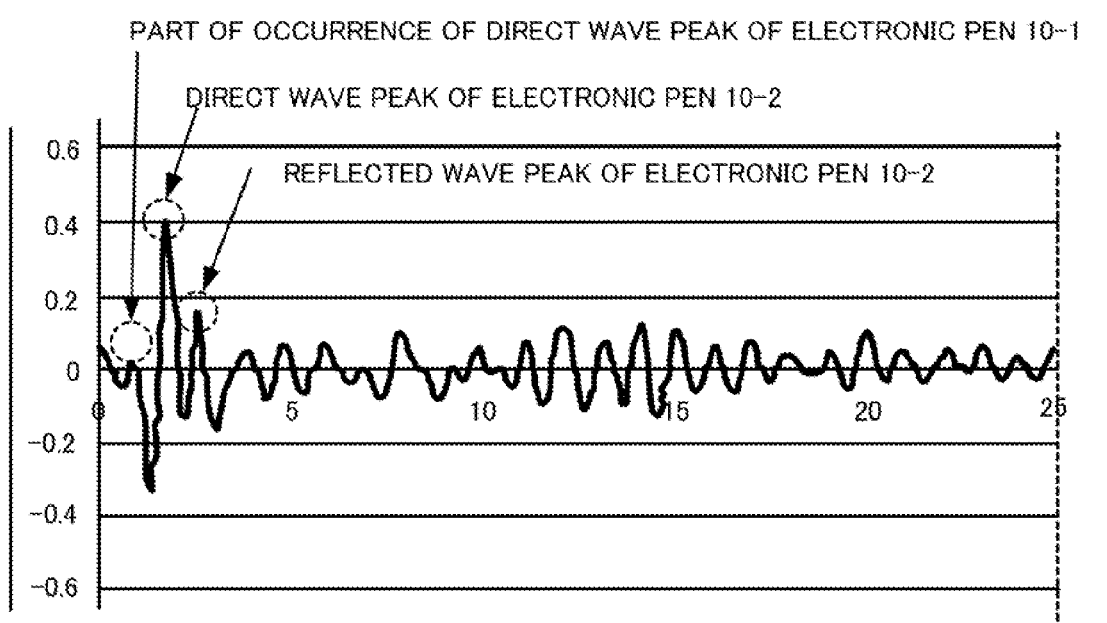
FIG. 11 is a diagram showing an example of a correlation value calculated by a data processing unit of the reception processing device according to the first exemplary embodiment of the present invention.

FIG. 11 is a diagram showing a plotted correlation value which is obtained by correlating the composite wave shown in FIG. 6 and the modulated wave shown in FIG. 2 which is an M sequence model waveform of the electronic pen 10-2.

As shown in FIG. 11, no peak of a direct wave of the ultrasonic signal from the electronic pen 10-1 appears because of an M sequence whose initial value is different from that of the electronic pen 10-2. Peak of the ultrasonic signal from the electronic pen 10-2 appears first (at the top). This enables detection of an arrival time of a direct wave from the electronic pen 10-2 without fail. Similarly, correlating the composite wave shown in FIG. 6 and the M sequence model waveform of the electronic pen 10-1 enables detection of an arrival time of the direct wave from the electronic pen 10-1.

(Effects of the First Exemplary Embodiment)

In a case where a plurality of electronic pens 10 are used simultaneously, even when a propagation distance between the transmission unit 100 and the reception unit 200 is long, a position of each electronic pen 10 can be detected by a direct wave arriving first at the reception unit 200 without being affected by a plurality of ultrasonic signals sent from the plurality of electronic pens 10. As a result, when a plurality of electronic pens are used simultaneously, a position of each electronic pen can be determined precisely and stably.

The reason is that by using an ultrasonic signal modulated by a different M sequence at the transmission unit 100 of each electronic pen 10 and setting a trigger signal to be an electromagnetic wave signal identifiable for each electronic pen 10, the reception device 20 generates an M sequence model waveform of each electronic pen 10 to calculate a correlation value between the ultrasonic signal in question and the generated M sequence model waveform, detect a first peak of the correlation value and precisely calculate a time of ultrasonic propagation from each electronic pen 10 based on a time of reception of the trigger signal and a time of detection of the correlation peak.

Second Exemplary Embodiment

Next, a position detection system according to a second exemplary embodiment of the present invention will be detailed with reference to FIG. 12.

Figure 12:
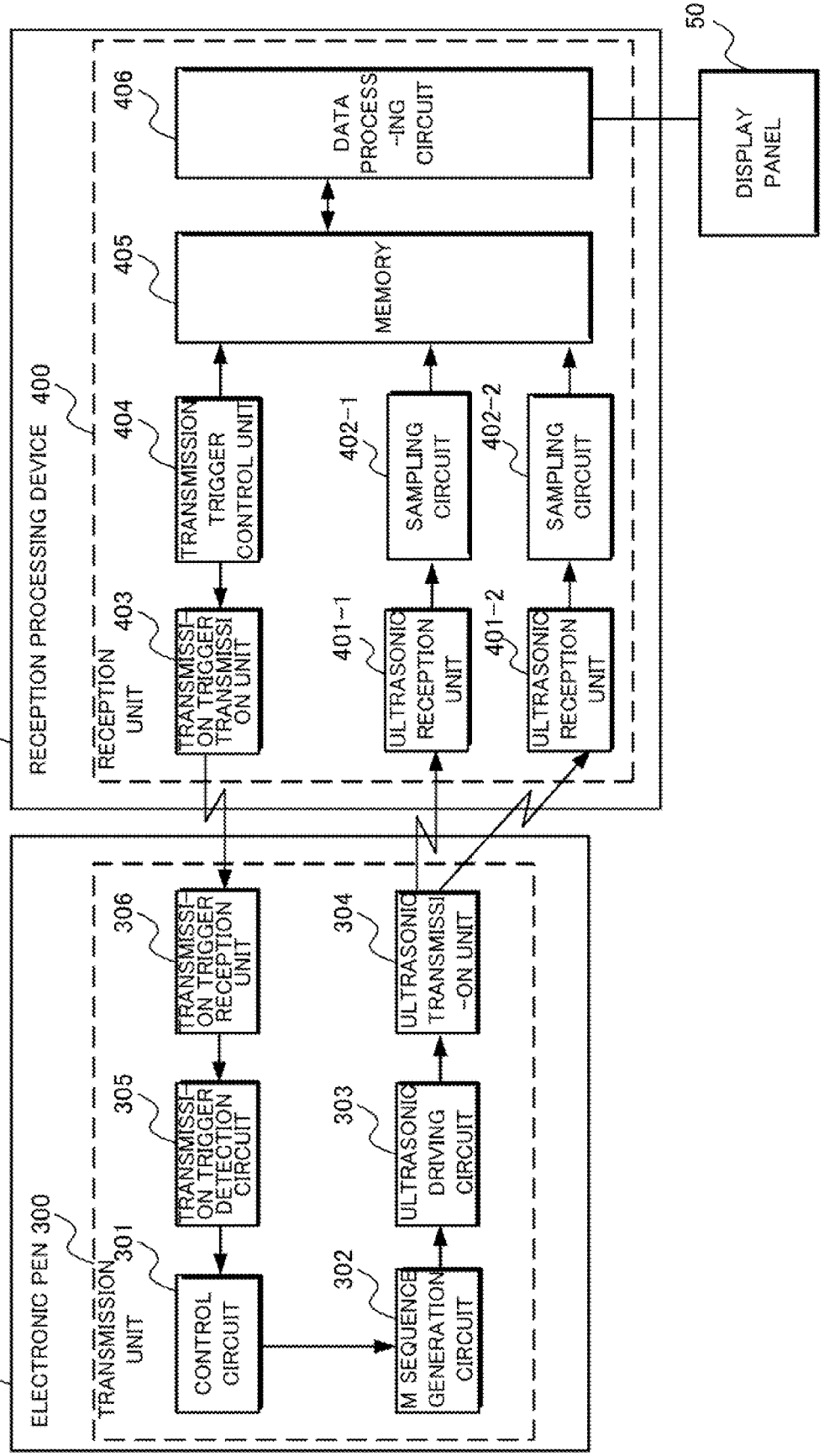
FIG. 12 is a block diagram showing a structure of an electronic pen system to which a position determination system according to a second exemplary embodiment of the present invention is applied.

In FIG. 12, the position detection system according to the second exemplary embodiment comprises an electronic pen 30 comprising a transmission unit 300, a reception device 40 comprising a reception unit 400 disposed at a predetermined position apart from the electronic pen 30, and the display panel 50 which displays a locus drawn by the electronic pen 30.

The transmission unit 300 of the electric pen 30 comprises a control circuit 301, an M sequence generation circuit 302, an ultrasonic driving circuit 303, an ultrasonic transmission unit 304, a transmission trigger detection circuit 305 and a transmission trigger reception unit 306.

The present exemplary embodiment, unlike the electronic pen 10 according to the first exemplary embodiment, comprises the transmission trigger reception unit 306 and the transmission trigger detection circuit 305 in place of the reception trigger driving unit 105 and the reception trigger transmission unit 106.

With no trigger signal transmitted from the electronic pen 30, a transmission trigger signal from the reception device 40 is received at the transmission trigger reception unit 306 and a trigger pulse is detected by the transmission trigger detection unit 305.

The control circuit 301 outputs M sequence characteristic polynomial and initial condition set in advance to the M sequence generation circuit 302 in synchronization with a notification of trigger pulse detection from the transmission trigger detection unit 305.

The ultrasonic driving circuit 303 and the ultrasonic transmission unit 304 operate similarly to the ultrasonic driving circuit 103 and the ultrasonic transmission unit 104 of the first exemplary embodiment.

On the other hand, the reception unit 400 of the reception device 40 comprises ultrasonic reception units 401-1 and 401-2, sampling circuits 402-1 and 402-2, a transmission trigger transmission unit 403, a transmission trigger control unit 404, a memory 405 and a data processing circuit 406.

Unlike the electronic pen 10 according to the first exemplary embodiment, the present exemplary embodiment comprises the transmission trigger transmission unit 403 and the transmission trigger control circuit 404 in place of the reception trigger reception unit 203 and the reception trigger detection circuit 204.

The transmission trigger control circuit 404 generates a transmission trigger driving signal and the transmission trigger transmission unit 403 sends out a transmission trigger signal driven by the transmission trigger driving signal into space. The transmission trigger control circuit 404 also has a function of storing a transmission time of a transmission trigger signal transmitted from the transmission trigger transmission unit 403 in the memory 405.

Figure 13:
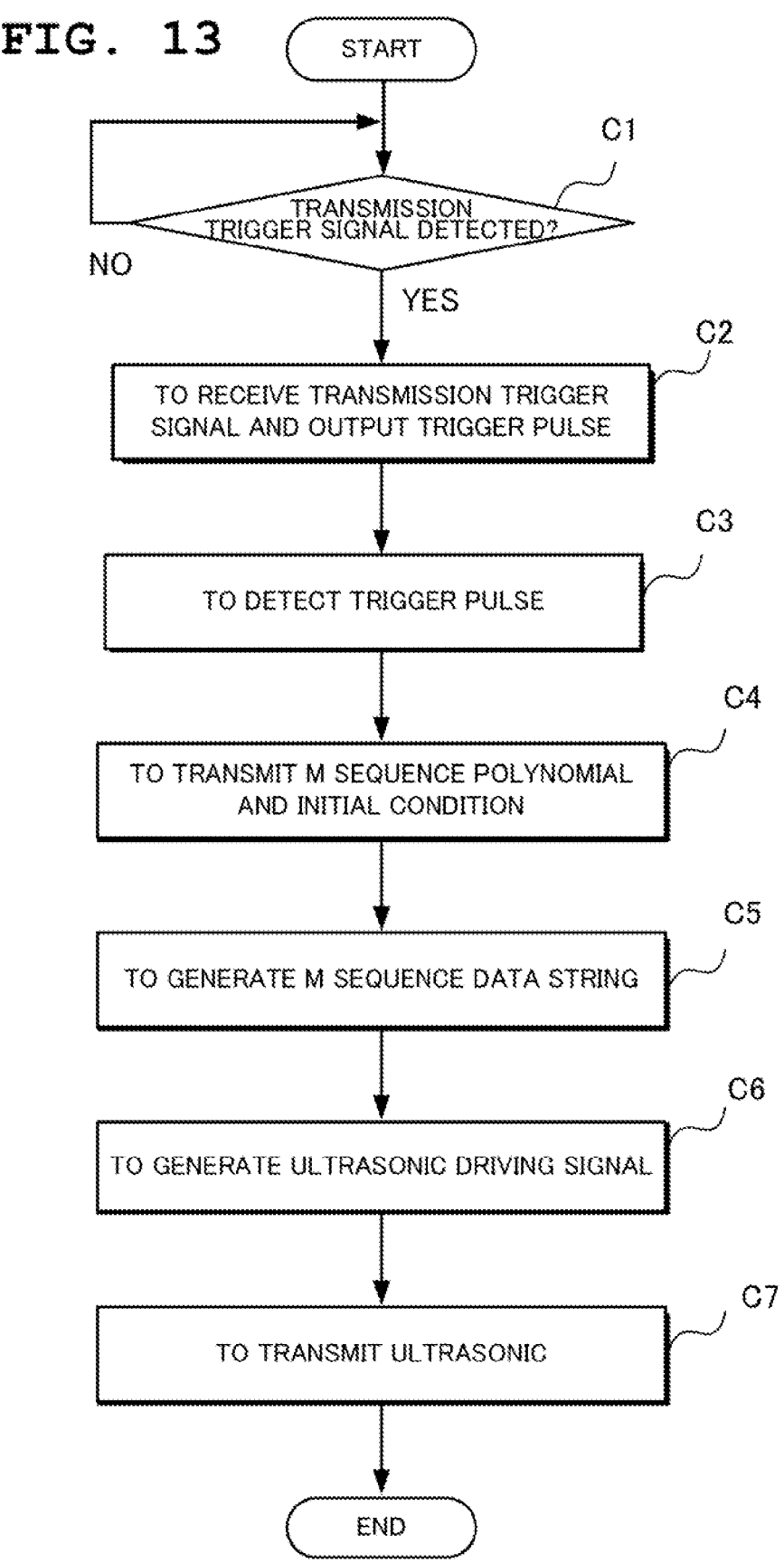
FIG. 13 is a flow chart for use in explaining operation of the electronic pen according to the second exemplary embodiment of the present invention.

Operation of the transmission unit 300 of the above-described electronic pen 30 will be described with reference to the flow chart of FIG. 13.

Upon receiving a transmission trigger signal from the reception device 40 (Step C1), the transmission trigger reception unit 306 converts the signal into an electric signal to output a trigger pulse (Step C2).

Upon detecting the trigger pulse from the output of the transmission trigger reception unit 306, the transmission trigger detection circuit 305 notifies the control circuit 301 of the detection (Step C3).

Upon receiving the notification from the transmission trigger reception unit 306, the control circuit 301 transmits M sequence characteristic polynomial and initial condition set in advance to the M sequence generation circuit 302 (Step C4).

The M sequence generation circuit 302 generates M sequence data as a coded bit string of an M sequence according to the characteristic polynomial and initial condition received from the control circuit 301 (Step C5).

The ultrasonic driving circuit 303 generates a driving signal which modulates ultrasonic by the M sequence data from the M sequence generation circuit 302 (Step C6).

The ultrasonic transmission unit 304 sends out an ultrasonic signal which is M-sequence-modulated by the driving signal into space (Step C7).

As compared with the first exemplary embodiment, the second exemplary embodiment has reception trigger driving signal generation and trigger signal transmission steps omitted.

Next, operation of the reception device 40 will be described with reference to the flow charts shown in FIG. 14 and FIG. 15.

Figure 14:
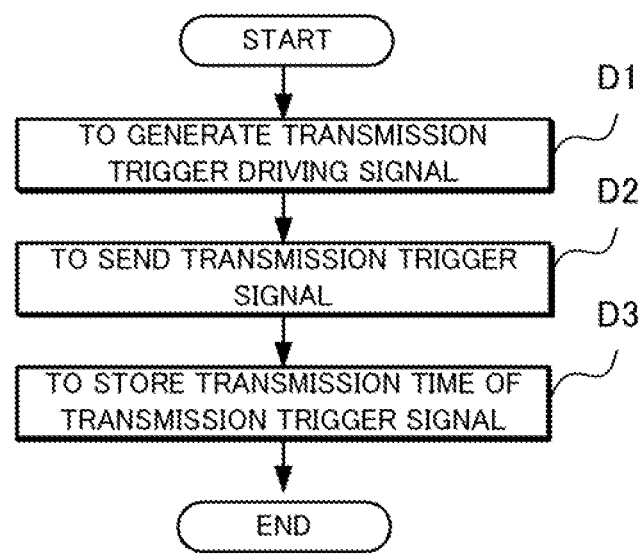
FIG. 14 is a flow chart for use in explaining operation of a reception processing device according to the second exemplary embodiment of the present invention.

FIG. 14 is a flow chart showing operation of the transmission trigger control circuit 404 and the transmission trigger transmission unit 403.

In FIG. 14, the transmission trigger control circuit 404 generates a transmission trigger driving signal (Step D1). From the reception device 40 into space, the transmission trigger transmission unit 403 sends out a transmission trigger signal driven by the transmission trigger driving signal from the transmission trigger control circuit 404 (Step D2).

On the other hand, the transmission trigger control circuit 404 stores a transmission time of the transmission trigger signal transmitted from the transmission trigger transmission unit 403 in the memory 405 (Step D3).

The ultrasonic reception units 401-1 and 401-2 receive an ultrasonic signal transmitted from the electronic pen 303 and convert the same into an electric signal and the sampling circuits 402-1 and 402-2 sample the electric signal at fixed intervals to sequentially store the sampled waveform data in the memory 405.

Figure 15:
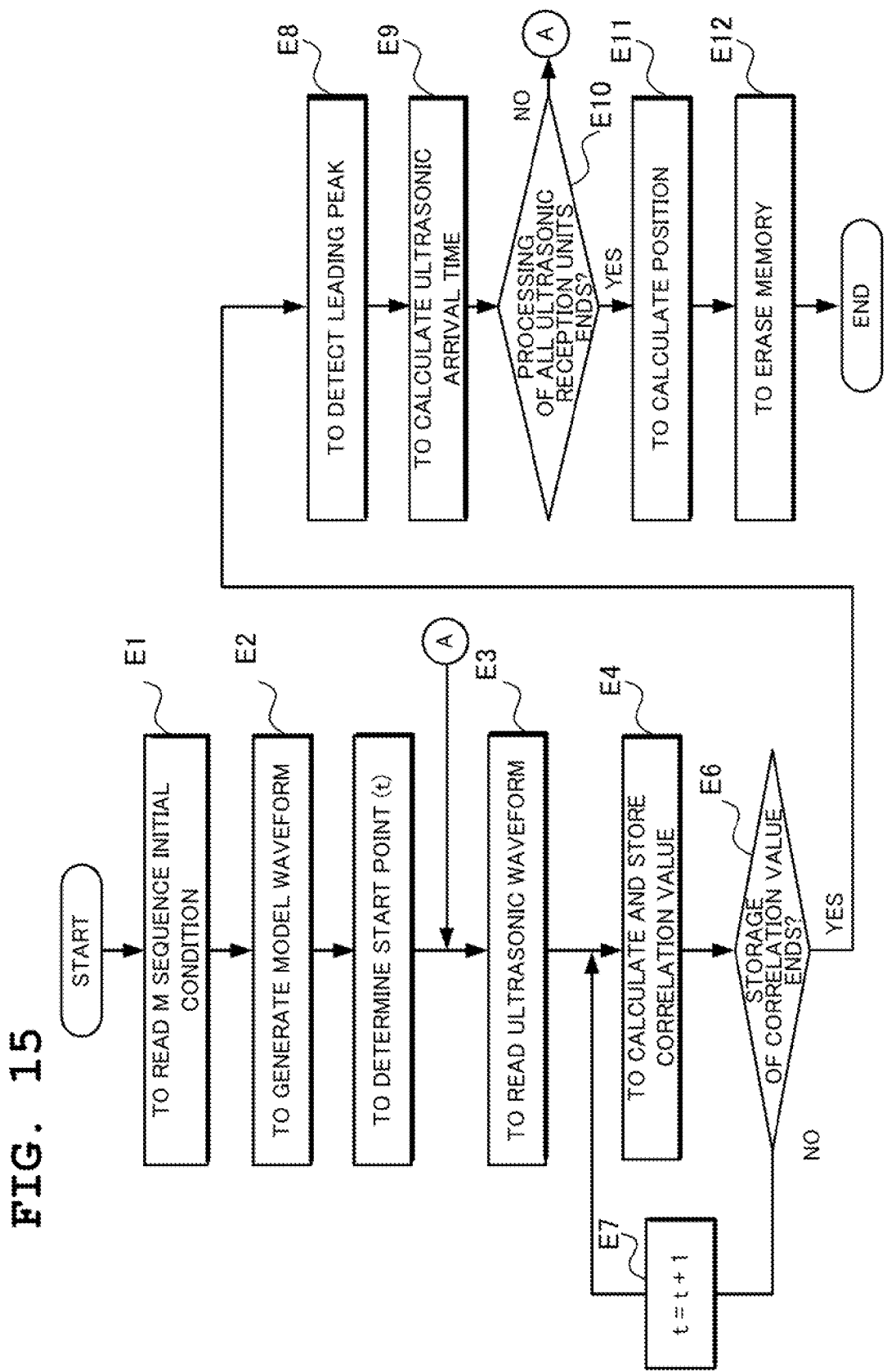
FIG. 15 is a flow chart for use in explaining operation of the reception processing device according to the second exemplary embodiment of the present invention.

FIG. 15 is a flow chart showing processing contents of the data processing circuit 406.

In FIG. 15, the data processing circuit 406 reads the same M sequence initial condition as that of the transmission unit 300 of the electronic pen 30, generates an M sequence model waveform of a transmitted ultrasonic signal and executes processing of correlation with an ultrasonic waveform stored in the memory 405 to sequentially store a correlation value in the memory 405 (Steps E1 through E6).

Upon detecting a leading peak of the correlation value stored in the memory 405, the data processing circuit 406 calculates a lapse of time from a transmission time of a transmission trigger signal until a time of detection of the leading peak, that is, a time of propagation of the ultrasonic signal arriving at the reception device 40 from the electronic pen 30, as well as calculating a position of the electronic pen 30 on the display panel 50 based on the propagation time calculated for each ultrasonic signal and the interval length between the ultrasonic reception units 401-1 and 401-2 (Steps E8 through E11).

Since as compared with the first exemplary embodiment shown in FIG. 4, the processing contents of the data processing circuit 406 are the same as those of the first exemplary embodiment except that detection of a reception trigger pulse is omitted, no detailed description will be made thereof.

Effects of the Second Exemplary Embodiment

The second exemplary embodiment attains the same effect as that of the above-described first exemplary embodiment and also attains the effect of simplification of the structure of the transmission unit 100 in the electronic pen 10 because the transmission device 20 is structured to transmit a transmission trigger signal. Further effect is eliminating the need of setting a trigger signal to be an electromagnetic wave signal identifiable for each electronic pen 10.

Third Exemplary Embodiment

Next, a position detection system according to a third exemplary embodiment of the present invention will be detailed with reference to FIG. 16.

While in the above-described first exemplary embodiment, the description has been made of a case where at the time of system set-up, an initial condition of an M sequence for use for each electronic pen 10 is determined and assigned to the electronic pen 10 in advance in the M sequence selection mode, the present exemplary embodiment is structured to set an initial condition of an M sequence for use by calibration before product shipment of an electronic pen system or before starting the use of the same.

Figure 16:
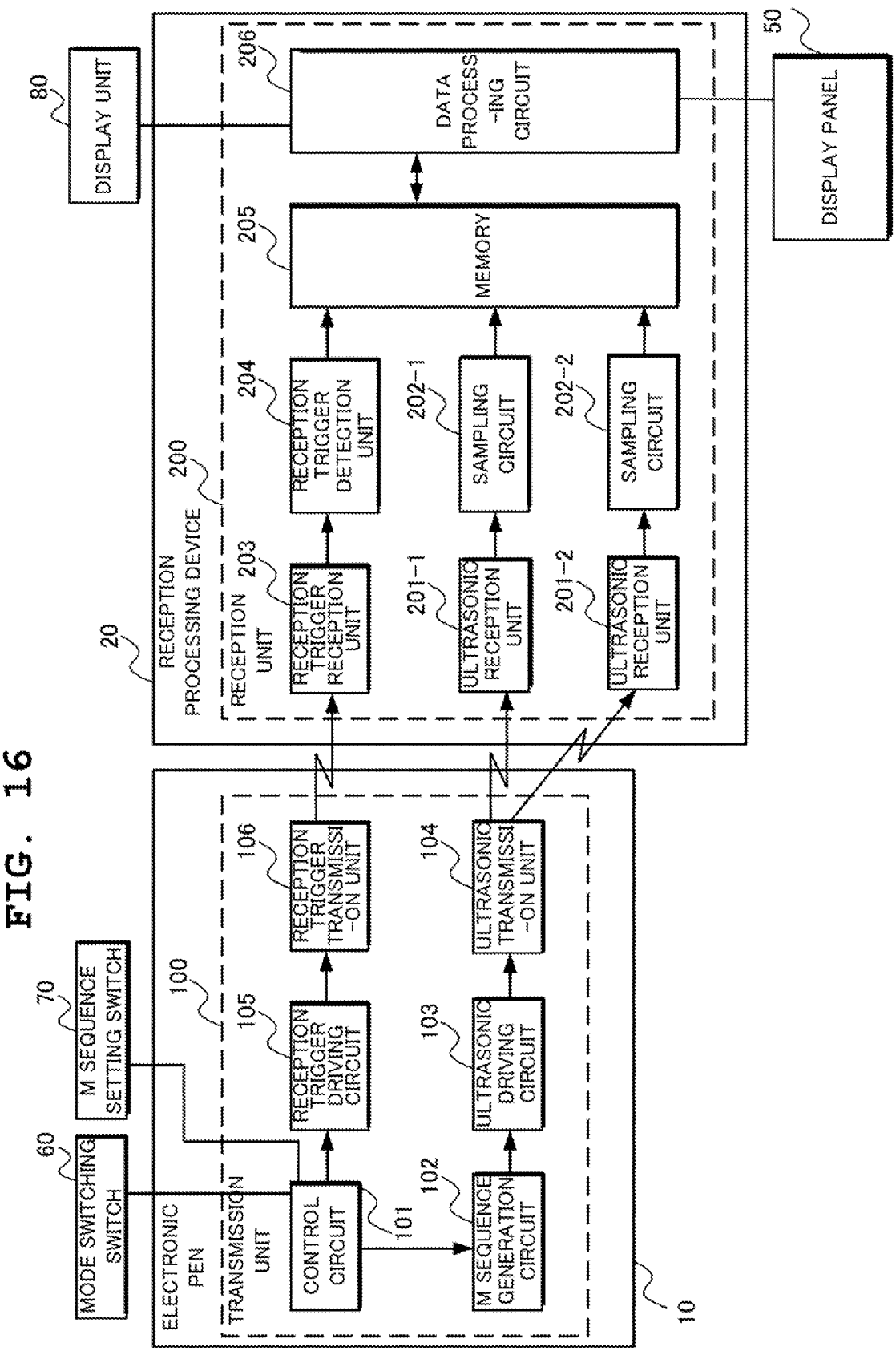
FIG. 16 is a block diagram showing a structure of an electronic pen system to which a position determination system according to a third exemplary embodiment of the present invention is applied.
Figure 17:
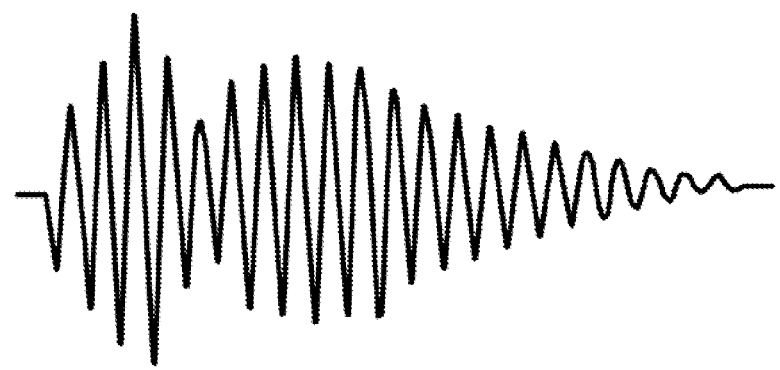
FIG. 17 is a diagram showing an example of an ultrasonic waveform according to the related art.
Figure 18:
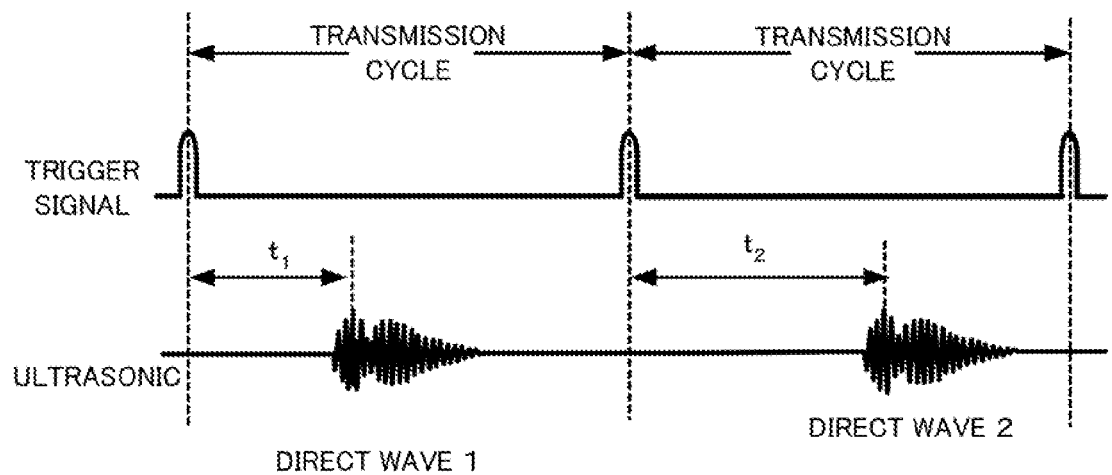
FIG. 18 is a diagram showing an example of a trigger signal and an ultrasonic waveform according to the related art.
Figure 19:
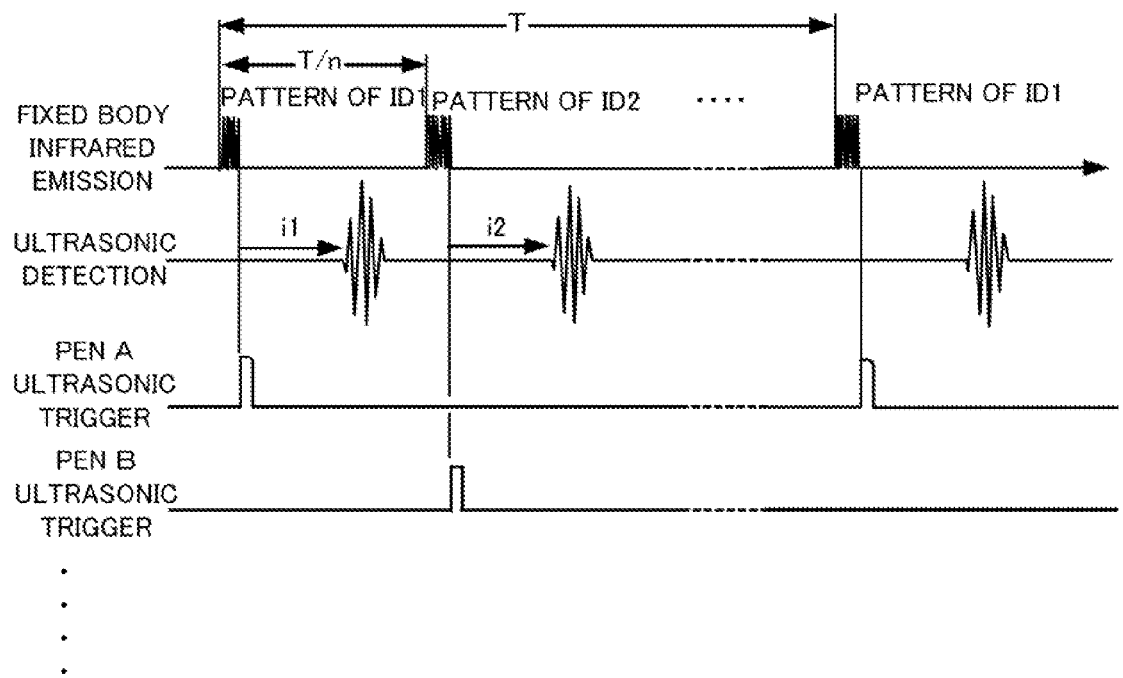
FIG. 19 is a diagram showing an example of a transmission trigger signal and an ultrasonic waveform according to the related art.

In the position detection system according to the third exemplary embodiment, as shown in FIG. 16, the electronic pen 10 comprises a mode switching switch 60 for executing switching between an M sequence selection mode and an ordinary position detection mode, and an M sequence setting switch 70 for setting an M sequence to be used.

Used as the M sequence setting switch 70 is a switch which enables a current setting state to be confirmed such as a rotary switch. Providing the M sequence setting switch 70 with a position for turning on/off the M sequence selection mode to switch to the ordinary position detection mode when the M sequence selection mode is off enables omission of the mode switching switch 60.

The reception device 20 also comprises a setting contents display unit 80 for displaying an M sequence set for each electronic pen 10.

Since the remaining part of the structure of the electronic pen 10 and the reception device 20 according to the present exemplary embodiment is the same as that of the first exemplary embodiment shown in FIG. 1, no description will be made of each component.

In the following, description will be made of a procedure of setting an initial condition of an M sequence for use by calibration.

At the time of calibration, set the M sequence selection mode by switching the mode switching switch 60 of the electronic pen 10 (Step F1).

Place the electronic pen 10 at a predetermined position apart from the reception device 20.

Send out a trigger signal and an ultrasonic signal from the electronic pen 10 repeatedly. Using at this time an M sequence varying at each transmission is the same as that in a case of the first exemplary embodiment.

At every reception of an ultrasonic signal from the electronic pen 10, the reception device 20 obtains a value of correlation with all the M sequence model waveforms of the ultrasonic for use and checks a value of cross-correlation between different M sequences.

Then, similarly to the first exemplary embodiment, give higher evaluation to M sequence data whose peak of a cross-correlation value is smaller and starting with an M sequence whose peak of a cross-correlation value is the smallest among all the M sequences, determine, as an M sequence to be assigned to each electronic pen 10, an M sequence (initial condition) forming a combination of M sequences for the cross-correlation value.

The reception device 20 may first calculate a self-correlation value and determine a time point of a peak of a self-correlation value corresponding to each distance between the electronic pen 10 and each ultrasonic reception unit of the reception device 20 to evaluate a peak of a cross-correlation value within a certain time range designated in advance including the peak time point.

When the calibration is completed, the setting contents display unit 80 connected to the reception device 20 displays the M sequence to be set at each electronic pen 10.

Lastly, according to the information about the M sequence displayed on the setting contents display unit 80 of the reception device 20, set the M sequence to be used by operating the M sequence setting switch 70 of each electronic pen 10. This operation enables setting of M sequences without overlapping among the plurality of electronic pens 10.

In the position detection mode, the control circuit 101 outputs the initial condition of the M sequence set by the M sequence setting switch 70 to the M sequence generation circuit 102 at Step A1 in FIG. 2.

Since the remaining processing at the electronic pen 10 and the data processing circuit 206 of the reception device 20 is the same as the processing according to the first exemplary embodiment shown in FIG. 4, no description will be made thereof.

It can be structured such that the M sequence setting switch 70 provided in the electronic pen 10 changes setting of an M sequence, as well as transmitting current setting contents from the reception trigger transmission unit 106 as M sequence setting data, so that the reception device 20 displays the M sequence setting data transmitted from the electronic pen 10 on the setting contents display unit 80 connected. With such arrangement, the electronic pen 10 side may have none of a function of confirming a current setting state.

Effects of the Third Exemplary Embodiment

According to the first exemplary embodiment, since at the time of system set-up, an M sequence to be used is assigned and set for each electronic pen 10 in advance in the M sequence selection mode, it is impossible to change an M sequence to be assigned to each electronic pen 10 at the time of use in the ordinary position detection mode or the like, and for increasing the number of electronic pens to be used, such processing is required as adding an electronic pen for which an M sequence not overlapping is set in advance or processing, which is to be executed on the side of a manufacturer, of executing the M sequence selection mode again to assign an M sequence to each electronic pen.

Since the third exemplary embodiment is structured to set an initial condition of an M sequence to be used by using calibration before product shipment of an electronic pen system or before starting of use of the same, a user is allowed to change an M sequence to be assigned to each electronic pen 10 during system operation. Accordingly, even the increase of the number of electronic pens for use can be coped with by appropriate change of M sequence assignment on a user side without the need of assignment work on a manufacturer side. Assignment of an appropriate M sequence is also possible according to surrounding environments to be used.

Although the present invention has been described with respect to the preferred exemplary embodiments and modes of implementation in the foregoing, the present invention is not necessarily limited to the above-described exemplary embodiments and modes of implementation and can be implemented in various modifications without departing from the scope of its technical ideas.

While the above-described respective exemplary embodiments have been described with respect to a case where the present invention is applied to an electronic pen system, it can be applied to a robot system. Disposing a transmission device in a robot and disposing a reception device on a ceiling or a wall in certain space enables detection of a position of the robot in the space. Grasping the position of the robot in the space allows such use as controlling the robot to prevent collision.

On the other hand, attaching the transmission device at a human body or the like and disposing the reception device on a ceiling or a wall in certain space allows such use as detection of a traffic line or position tracing in the space.

In either case, it is possible to set up an environment where a plurality of movable bodies exist by using ultrasonic of a different M sequence for each movable body.

While the description has been so far made of modulation by an M sequence, it is not limited to an M sequence as long as it is a pseudo random signal whose self-correlativity is high and whose cross-correlativity with other sequence is low such as a Gold sequence.

While used so far is a data string whose sequence length generated by the quartic characteristic polynomial $f(x)=x^4+x+1$ is 15 bits, it is also possible to use a partial string of an M sequence whose sequence length is longer and select a combination of partial strings whose partial cross-correlativity is low. As an example, description will be made of a case where used is a partial string of 15 bits taken from an M sequence whose sequence length is 127 bits and which is obtained with an initial value "0000111" by a hepta-characteristic-polynomial $f(x)=x^7+x^3+1$.

Figure 20:
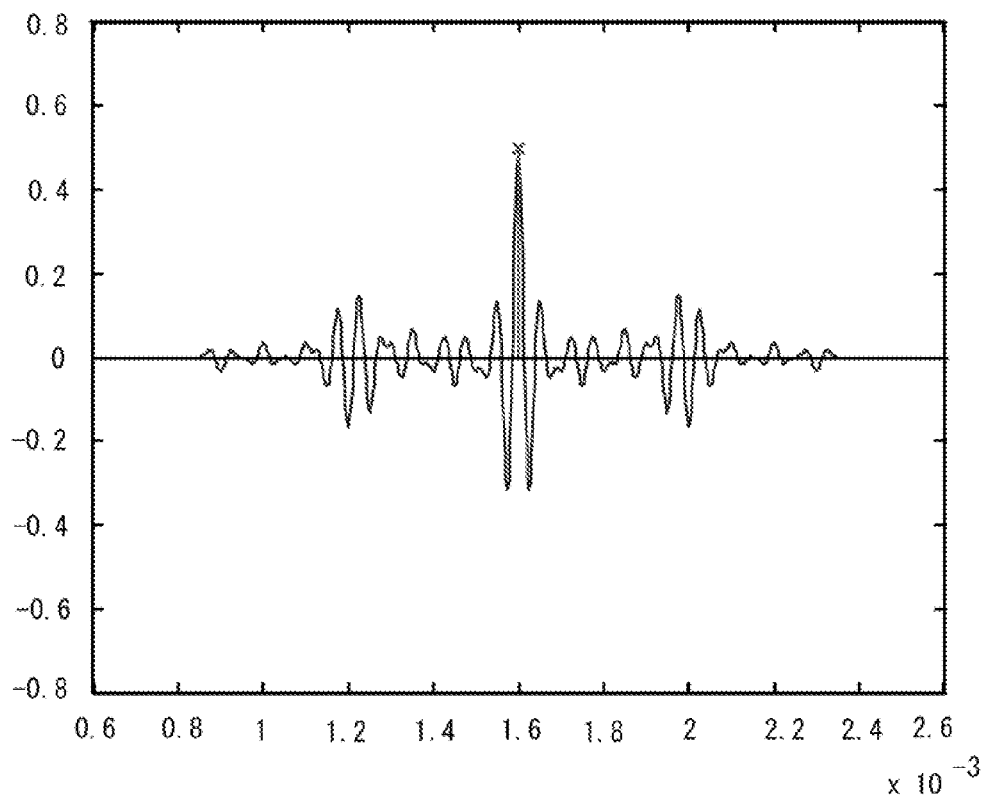
FIG. 20 is a diagram showing an example in which a partial string of 15 bits is used which is taken out from an M sequence having a 127-bit sequence length generated by a hepta-characteristic-polynomial.
Figure 21:
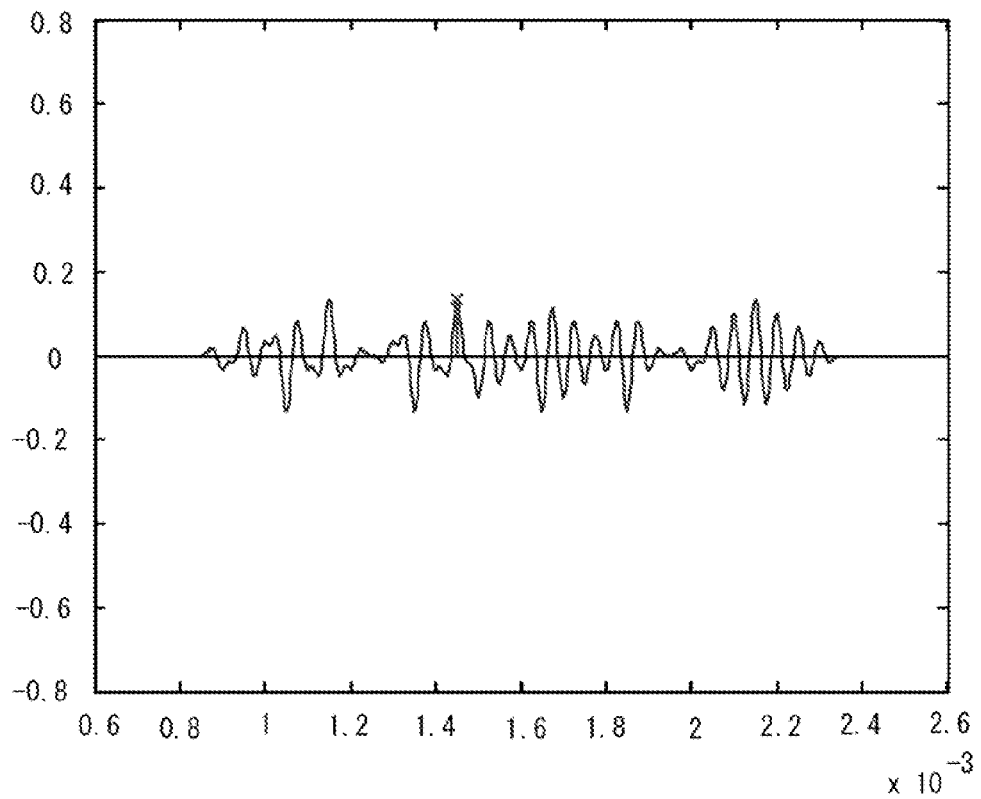
FIG. 21 is a diagram showing an example in which a partial string of 15 bits is used which is taken out from an M sequence having a 127-bit sequence length generated by a hepta-characteristic-polynomial.
Figure 22:
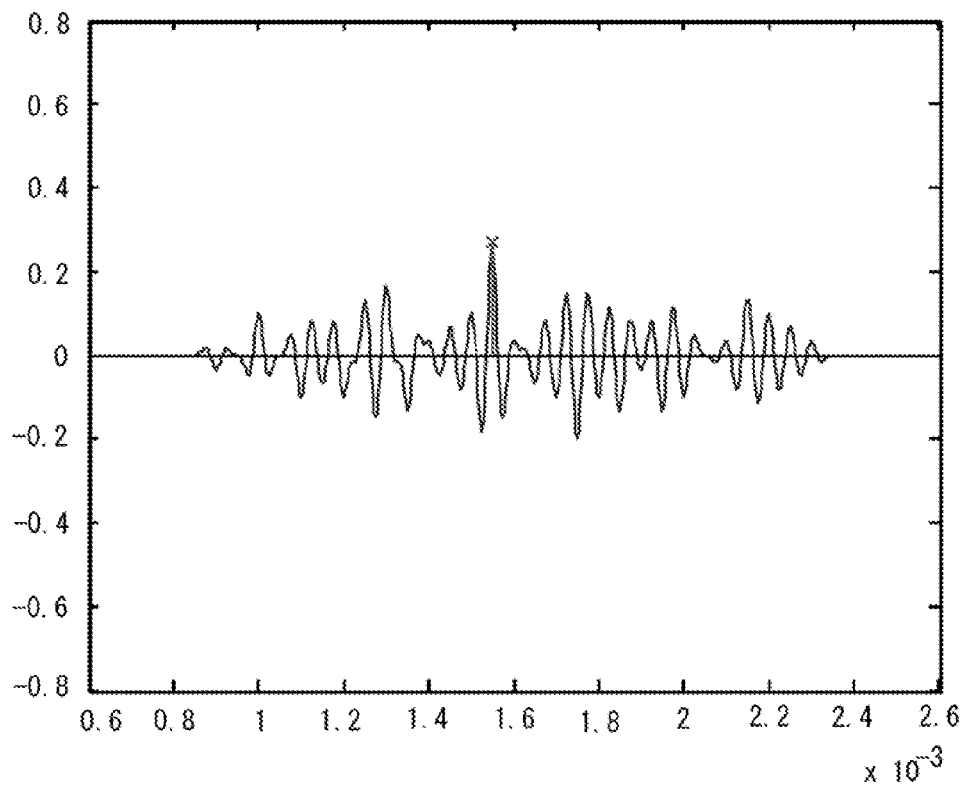
FIG. 22 is a diagram showing an example in which a partial string of 15 bits is used which is taken out from an M sequence having a 127-bit sequence length generated by a hepta-characteristic-polynomial.

FIG. 20 is a diagram showing a calculated self-correlation of ultrasonic whose phase is modulated by a partial string "000011101111001" of leading 15 bits out of 127 bits with respect to a reference waveform of the same bit string. FIG. 21 is a diagram showing a calculated cross-correlation between ultrasonic whose phase is modulated by a partial string "011001001000000" of 15 bits out of 127 bits as well and a reference waveform of "000011101111001". FIG. 22 is a diagram showing a calculated cross-correlation between ultrasonic whose phase is modulated by a partial string "001111011010000" of 15 bits out of 127 bits as well and a reference waveform of "000011101111001".

In evaluation of peaks of the respective cross-correlation values, since a peak of the cross-correlation value between "000011101111001" and "011001001000000" is smaller than a peak of the cross-correlation value between "000011101111001" and "001111011010000", select "000011101111001" and "011001001000000".

Figure 23:
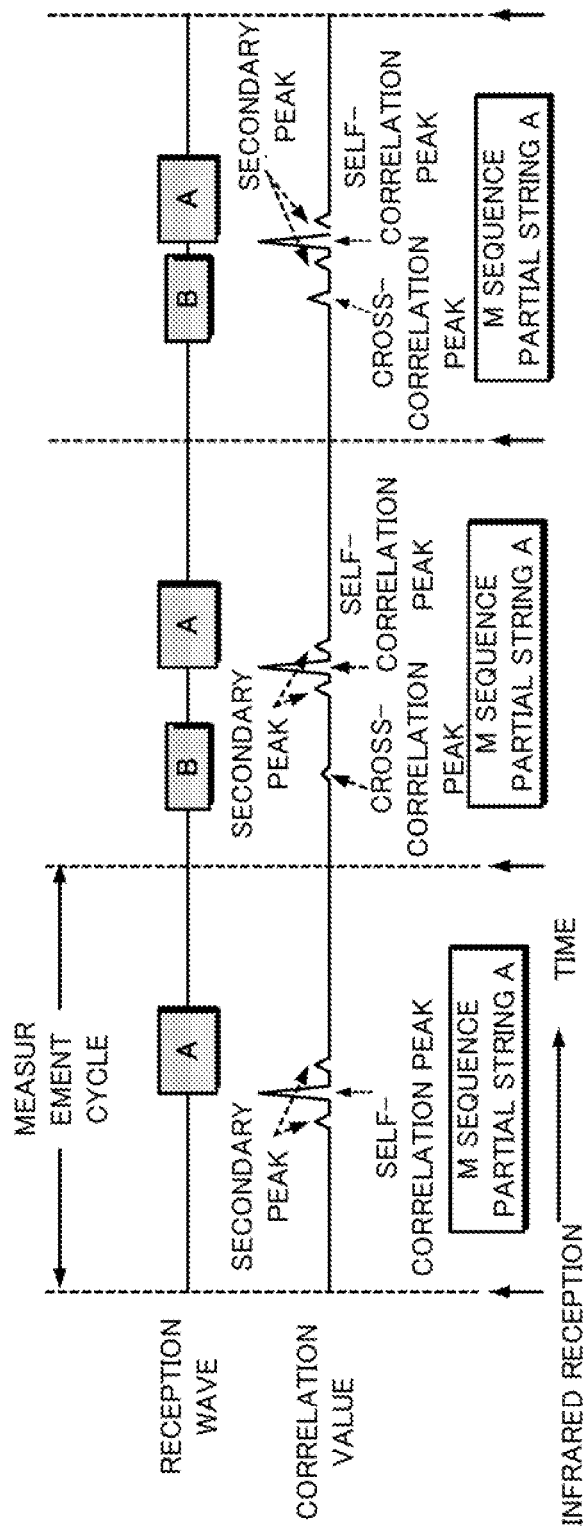
FIG. 23 is a diagram showing an example in which a partial string of 15 bits is used which is taken out from an M sequence having a 127-bit sequence length generated by a hepta-characteristic-polynomial.

Assume an M sequence partial string A is "000011101111001" and an M sequence partial string B is "011001001000000", by correlating a waveform of ultrasonic with a reference waveform of the partial string A, an arrival point of the ultrasonic of the partial string A can be reliably obtained as a correlation peak as shown in FIG. 23. Similarly, by correlating the waveform with a reference waveform of the partial string B, an arrival point of the ultrasonic of the partial string B can be reliably obtained as a correlation peak.

Combination of the above-described respective exemplary embodiments is also possible.

While the present invention has been described with respect to the preferred exemplary embodiments (and modes of implementation) in the foregoing, the present invention is not necessarily limited to the above-described exemplary embodiments (and modes of implementation). The structures and details of the present invention allow various modifications that those skilled in the art can understand within the scope of the present invention.

INCORPORATION BY REFERENCE

This application is based upon and claims the benefit of priority from

Japanese patent application No. 2007-339054, filed on Dec. 28, 2007, the disclosure of which is incorporated herein in its entirety by reference.

What is claimed is:

1. A position detection system, comprising:
   at least one moving body including a transmission device which simultaneously sends out a trigger signal indicative of transmission timing and an ultrasonic signal modulated by M sequence data having high self-correlativity; and
   a reception device which receives said trigger signal and said ultrasonic signal to detect a position of said moving body, wherein
   said reception device comprising:
   at least two ultrasonic reception units provided with a predetermined interval which receive said ultrasonic signal;
   a unit which calculates a correlation value between a waveform of said ultrasonic signal and a modulation reference waveform of said M sequence data assigned in advance to said moving body;
   a unit which detects a first peak of said correlation value calculated and calculates a time of propagation of the ultrasonic signal to arrive at said two ultrasonic reception units from a time point of reception of said trigger signal and a time point of detection of the correlation peak; and
   a unit which calculates a position of said moving body based on said ultrasonic propagation time calculated and the interval length between said ultrasonic reception units, wherein
   said transmission device transmits a plurality of said ultrasonic signals based on a plurality of said M sequence data which can be set, and
   said reception device, at every reception of said plurality of ultrasonic signals, obtains values of correlation with modulation reference waveforms of all said M sequence data to be used for said ultrasonic signal and checks a cross-correlation value between different M sequence data to determine and assign said M sequence data to be assigned to said moving body according to a predetermined reference.

2. The position detection system according to claim 1, wherein said trigger signal is an electromagnetic wave signal which enables identification of said transmission device.

3. The position detection system according to claim 2, wherein said trigger signal is a signal whose band is divided to prevent overlap with respect to each said transmission device.

4. The position detection system according to claim 1, wherein
   said trigger signal is an electromagnetic wave signal modulated by M sequence data having high self-correlativity which differs with each said transmission device, and
   said reception device calculates a correlation value between a waveform of a received trigger signal and a modulation reference waveform set in advance and detects a top of the trigger signal differing with each said transmission device to generate timing as a start point of an arrival time of the ultrasonic signal.

5. The position detection system according to claim 1, wherein
   said reception device comprises a display unit which displays information of said M sequence data determined, and
   the transmission device of said moving body comprises a setting switch which sets said M sequence data for use for said ultrasonic signal based on the information of said M sequence data displayed on the display unit of said reception device.

6. The position detection system according to claim 1, wherein as M sequence data, a partial string of M sequence data is used.

7. The position detection system according to claim 1, wherein said moving body is an electronic pen.

8. The position detection system according to claim 1, wherein said moving body is a robot comprising said transmission device.

9. A position detection system, comprising:
   at least one moving body including a transmission device which sends out an ultrasonic signal modulated by M sequence data having high self-correlativity; and
   a reception device which receives said ultrasonic signal to detect a position of said moving body, wherein
   said transmission device of said moving body comprising:
   a unit which receives a trigger signal indicative of transmission timing; and
   a unit which transmits said ultrasonic signal at the timing of reception of said trigger signal,
   said reception device comprising:
   a unit which sends out said trigger signal;
   at least two ultrasonic reception units provided with a predetermined interval which receive said ultrasonic signal;

a unit which calculates a correlation value between a waveform of said ultrasonic signal and a modulation reference waveform of said M sequence data assigned in advance to said moving body;

a unit which detects a first peak of said correlation value calculated and calculates a time of propagation of the ultrasonic signal to arrive at said two ultrasonic reception units from a time point of reception of said trigger signal and a time point of detection of the correlation peak; and a unit which calculates a position of said moving body based on said ultrasonic propagation time calculated and the interval length between said ultrasonic reception units, wherein said transmission device transmits a plurality of said ultrasonic signals based on a plurality of said M sequence data which can be set, and said reception device, at every reception of said plurality of ultrasonic signals, obtains values of correlation with modulation reference waveforms of all said M sequence data to be used for said ultrasonic signal and checks a cross-correlation value between different M sequence data to determine and assign said M sequence data to be assigned to said moving body according to a predetermined reference.

10. A position detection method, including executing, at least one transmission device, a step of simultaneously transmitting a trigger signal indicative of transmission timing and an ultrasonic signal modulated by a M sequence data having high self-correlativity; and receiving, by a reception device, said trigger signal and executing, by said reception device, the steps of:

receiving said ultrasonic signal by at least two ultrasonic reception units provided with a predetermined interval;

calculating a correlation value between a waveform of said ultrasonic signal and a modulation reference waveform of said M sequence data assigned in advance to said moving body;

detecting a first peak of said correlation value calculated and calculating a time of propagation of the ultrasonic signal to arrive at said two ultrasonic reception units from a time point of reception of said trigger signal and a time point of detection of the correlation peak; and calculating a position of said moving body based on said ultrasonic propagation time calculated and the interval length between said ultrasonic reception units, wherein by said transmission device, transmitting a plurality of said ultrasonic signals based on a plurality of said M sequence data which can be set, and by said reception device, at every reception of said plurality of ultrasonic signals, obtaining values of correlation with modulation reference waveforms of all said M sequence data to be used for said ultrasonic signal and checking a cross-correlation value between different M sequence data to determine and assign said M sequence data to be assigned to said moving bodes according to a predetermined reference.

11. The position detection method according to claim 10, wherein said trigger signal is an electromagnetic wave signal which enables identification of said transmission device.

12. The position detection method according to claim 11, wherein said trigger signal is a signal whose band is divided to prevent overlap with respect to each said transmission device.

13. The position detection method according to claim 10, wherein said trigger signal is an electromagnetic wave signal modulated by a M sequence data having high self-correlativity which differs with each said transmission device, and said reception device calculates a correlation value between a waveform of a received trigger signal and a modulation reference waveform set in advance and detects a top of the trigger signal differing with each said transmission device to generate timing as a start point of an arrival time of the ultrasonic signal.

14. The position detection method according to claim 10, wherein said reception device comprises a display unit which displays information of said M sequence data determined, and the transmission device comprises a setting switch which sets said M sequence data for use for said ultrasonic signal based on the information of said M sequence data displayed on the display unit of said reception device.

15. The position detection method according to claim 10, wherein as a M sequence data random sequence, a partial string of M sequence data is used.

* * * * *